United States Patent
Patten et al.

(10) Patent No.: US 11,851,618 B2
(45) Date of Patent: Dec. 26, 2023

(54) STAGED OIL SHALE PROCESSING METHODS

(71) Applicant: Red Leaf Resources, Inc., Salt Lake City, UT (US)

(72) Inventors: James W. Patten, Sandy, UT (US); Tom Plikas, Salt Lake City, UT (US); Kerry Mckenna, Salt Lake City, UT (US)

(73) Assignee: Red Leaf Resources, Inc., Salt Lake City, UT (US)

( * ) Notice: Subject to any disclaimer, the term of this patent is extended or adjusted under 35 U.S.C. 154(b) by 85 days.

(21) Appl. No.: 17/381,862

(22) Filed: Jul. 21, 2021

(65) Prior Publication Data
US 2022/0025272 A1    Jan. 27, 2022

Related U.S. Application Data

(60) Provisional application No. 63/054,511, filed on Jul. 21, 2020.

(51) Int. Cl.
*C10G 1/00* (2006.01)
*C10G 1/04* (2006.01)
*C10G 1/02* (2006.01)

(52) U.S. Cl.
CPC .............. *C10G 1/002* (2013.01); *C10G 1/02* (2013.01); *C10G 1/045* (2013.01); *C10G 2300/4006* (2013.01); *C10G 2300/4031* (2013.01)

(58) Field of Classification Search
CPC ............ C10G 1/002; C10G 1/02; C10B 53/06
See application file for complete search history.

(56) References Cited

U.S. PATENT DOCUMENTS 2,813,583 A    11/1957    Marx et al.
3,428,125 A     2/1969    Parker
(Continued)

FOREIGN PATENT DOCUMENTS

WO    WO 2013/188646 A1    12/2013

OTHER PUBLICATIONS

Lewandowski et al.; "Efficiency and Proportions of Waste Tyre Pyrolysis Products Depending on The Reactor Type—A Review;" Journal of Analytical and Applied Pyrolysis; (2019); pp. 25-53; vol. 140; <doi: 10.1016/j.jaap.2019.03.018>.
(Continued)

*Primary Examiner* — Renee Robinson
(74) *Attorney, Agent, or Firm* — Thorpe North & Western, LLP.

(57) ABSTRACT

Recovering hydrocarbons from oil shale can include injecting a heated working fluid into a first vessel containing particulate oil shale in a pyrolysis mode. The heated working fluid can have a temperature above a production temperature to pyrolyze kerogen in a stationary bed of the oil shale at or above the production temperature. An effluent can concurrently flow out of the first vessel to be injected into a second vessel in preheating mode. The second vessel containing particulate oil shale has an average temperature below the production temperature so as to capture heat from the effluent sufficient to increase the average temperature of the particulate oil shale and to condense condensable hydrocarbon product while also removing entrained mineral fines mists of condensed hydrocarbons from the effluent. Liquid hydrocarbons can concurrently be collected from the first vessel and/or the second vessel.

38 Claims, 9 Drawing Sheets

(56) References Cited

U.S. PATENT DOCUMENTS

| | | |
|---|---|---|
| 3,522,842 A | 8/1970 | New |
| RE30,738 E | 9/1981 | Bridges et al. |
| 4,301,865 A | 11/1981 | Kasevich et al. |
| 4,373,581 A | 2/1983 | Toellner |
| 4,396,062 A | 8/1983 | Iskander |
| 4,438,816 A | 3/1984 | Urban et al. |
| 4,448,668 A | 5/1984 | Deering |
| 4,495,990 A | 1/1985 | Titus et al. |
| 4,553,592 A | 11/1985 | Looney et al. |
| 4,660,636 A | 4/1987 | Rundell et al. |
| 5,082,054 A | 1/1992 | Kiamanesh |
| 5,236,039 A | 8/1993 | Edelstein et al. |
| 6,133,491 A | 10/2000 | Xing |
| 6,991,032 B2 | 1/2006 | Berchenko et al. |
| 7,073,578 B2 | 7/2006 | Vinegar et al. |
| 7,091,460 B2 | 8/2006 | Kinzer |
| 7,109,457 B2 | 9/2006 | Kinzer |
| 7,115,847 B2 | 10/2006 | Kinzer |
| 7,225,866 B2 | 6/2007 | Berchenko et al. |
| 7,312,428 B2 | 12/2007 | Kinzer |
| 7,331,385 B2 | 2/2008 | Symington et al. |
| 7,461,693 B2 | 12/2008 | Considine et al. |
| 7,562,708 B2 | 7/2009 | Cogliandro et al. |
| 7,862,705 B2 | 1/2011 | Dana et al. |
| 7,934,549 B2 | 5/2011 | Cimolai |
| 8,021,445 B2 | 9/2011 | Shaffer |
| 8,082,995 B2 | 12/2011 | Symington et al. |
| 8,349,171 B2 | 1/2013 | Dana et al. |
| 8,365,478 B2 | 2/2013 | Dana et al. |
| 8,961,652 B2 | 2/2015 | Pattern |
| 9,914,879 B2 | 3/2018 | Otterstrom et al. |
| 10,208,254 B2 | 11/2019 | Otterstrom et al. |
| 2008/0190815 A1 | 8/2008 | Dana et al. |
| 2008/0202985 A1 | 8/2008 | Hatfield et al. |
| 2010/0096295 A1 | 4/2010 | Pringle et al. |
| 2010/0200467 A1 | 8/2010 | Dana et al. |
| 2013/0153210 A1 | 6/2013 | Menard et al. |
| 2013/0334106 A1 | 12/2013 | Patten |
| 2015/0114885 A1 | 4/2015 | Keracik |
| 2015/0204179 A1 | 7/2015 | Affholter et al. |
| 2015/0257404 A1 | 9/2015 | Isenberg et al. |
| 2019/0119578 A1 | 4/2019 | Patten |

OTHER PUBLICATIONS

Office of Technology Assessment; "An Assessment of Oil Shale Technologies;" Technology; (1980); pp. 117-176.

Wang et al.; "A New Idea for In-Situ Retorting Oil Shale by Way of Fluid Heating Technology;" Oil Drilling & Production Technology; Production Technology Research Institute of Huabei Oil Corporation; (2014); pp. 71-74; vol. 36, issue 4.

STAGED OIL SHALE PROCESSING METHODS

RELATED APPLICATION

This application claims priority to U.S. Provisional Application No. 63/054,511, filed Jul. 21, 2020 which is incorporated herein by reference.

BACKGROUND

Many processes have been developed for producing hydrocarbons from oil shale. Generally, methods for recovering hydrocarbon products from oil shale have involved applying heat to the oil shale. Heating oil shale allows kerogen in the oil shale to break down through the process of pyrolysis, yielding liquid and vapor hydrocarbon compounds. Current oil shale processing technologies suffer from various drawbacks such as high energy requirements (energy cost and high production of $CO_2$), difficulty (and associated costs) in separating liquid aerosols from produced gas, costs associated with minimization of mineral fines entrapped in produced oil, poor permeability (high pumping work), excessive initial capital costs, and other challenges.

SUMMARY

The present disclosure describes methods of recovering hydrocarbon products from oil shale using multiple staged vessels for processing. The vessels can be operated in several modes, including a startup mode, preheating mode, a pyrolysis mode, a cooling mode, and optionally an emptying and refill mode.

In some examples, multiple vessels filled with oil shale can be heated and cooled using a working gas made up of products of pyrolysis. This working gas can be heated with an external heat source, such as, for example, electric resistance heaters, a hydrocarbon fuel combustor with a gas-to-gas heat exchanger, a gas turbine with a gas-to-gas heat exchanger in its exhaust stream, or any other suitable heat source capable of heating a gas stream such as direct contact or a gas-to-gas heat exchanger. In certain examples, the working gas can be exclusively products of pyrolysis after the system has started up. However, a startup stage can be used first to begin heating the oil shale. At the beginning of the startup stage, multiple vessels can be filled with cold raw oil shale. One of the vessels can then be heated. Instead of using hydrocarbon products from the oil shale (because hydrocarbon production has not begun at this point), a surrogate working fluid can be used to heat the first vessel.

In some examples, the surrogate working fluid can include natural gas or methane that is heated from ambient temperature to a temperature above a production temperature. In some alternatives, a mixture of hydrocarbon products and surrogate working fluid can be used during a transition to hydrocarbon product working fluid. The production temperature is a temperature that is sufficient to liberate hydrocarbons from the oil shale through pyrolysis while the oil shale is maintained as a substantially stationary bed. In one example, the surrogate working fluid can be injected into the top of the first vessel. The surrogate working fluid can carry heat to the oil shale near the top of the vessel, thereby heating the oil shale at the top of the vessel to near the temperature of the surrogate working fluid. In this example, the first vessel would now be in the pyrolysis stage.

As the working fluid moves downward through the vessel, the working fluid temperature decreases and the oil shale at each location in the vessel is heated to the temperature of the working fluid at that location. At the bottom of the vessel, the oil shale remains at ambient temperature and the working fluid flowing out of the bottom of the vessel is also at ambient temperature.

In this example, the temperature of the oil shale can increase over time in the lower parts of the first vessel. As the oil shale in progressively lower locations reaches the production temperature, the oil shale can undergo pyrolysis and release hydrocarbon products. The zone of active pyrolysis can thus extend downward through the vessel over time. When the oil shale in the first vessel is producing hydrocarbons in this way, the first vessel can be referred to being in the pyrolysis stage, as well as in the startup stage. At some point in time, the working fluid flow out of the bottom of the first vessel will be at a temperature significantly higher than the initial ambient temperature. At this point, the working fluid will also include gaseous hydrocarbon products liberated from the hot oil shale in the first vessel.

The hotter working fluid flowing out of the first vessel can then be injected into the top of a second vessel full of cold oil shale. The working fluid can transfer heat to the oil shale in the second vessel. The oil shale at the top of the second vessel can heat up first to the temperature of the working fluid. The oil shale at the bottom of the second vessel can remain an ambient temperature for a time, and the working fluid flowing out of the bottom of the second vessel can also be at ambient temperature. At this point, the second vessel can be referred to as being in a preheat stage. The oil shale in the second vessel is preheated by the working fluid from the first vessel. At the same time, some hydrocarbon products from the first vessel that are in a vapor state or entrained as droplets in the gaseous working fluid can be condensed in the colder bottom section of the second vessel. These liquid hydrocarbon products can be collected from the second vessel. Accordingly, the second vessel, in the preheat stage, can act as a condenser and help in collecting liquid hydrocarbon products. This can reduce the cost of the system compared to a system that has an additional condenser unit. Also, compared to a system that has an additional (external) heat exchanger, this system captures heat from the working gas and uses it for preheat, as opposed to rejecting this heat to the external surrounding environment as lost heat.

Eventually, all of the oil shale in the first vessel can be fully retorted. At this point, cold working gas can be injected into the top of the first vessel to cool the oil shale in the first vessel. Cold working gas can be injected once the first vessel is fully retorted, or injected once sufficient heat is present and migrating through the shale bed to complete pyrolysis of substantially all of the shale. This can be referred to as the beginning of the cooling stage, even when some final pyrolysis continues. As the working gas flows through the first vessel, the working gas can pick up heat from the hot oil shale. Thus, the working gas exiting the bottom of the first vessel can still be at the production temperature. This hot working gas can be injected into the top of the second vessel. In some cases, additional heat can be added to the working gas so that it has a temperature above the production temperature. When the hot working gas at or above the production temperature begins to be injected into the second vessel, then the second vessel can be referred to as being in the pyrolysis stage.

As the oil shale in the first vessel cools, the working fluid flowing out the bottom of the first vessel can become colder.

The oil shale can eventually cool to a temperature at which the spent oil shale can be safely handled and emptied. At this point, the flow of working fluid to the first vessel can be stopped and the first vessel can be emptied and refilled. This can be referred to as the emptying and refilling stage.

Additionally, during the cooling stage of the first vessel, the pyrolysis zone in the second vessel can be moving downward toward the bottom of the second vessel. The temperature of the working fluid exiting the bottom of the second vessel can increase until the temperature is significantly above ambient temperature. At this point, the working fluid flowing out of the bottom of the second vessel can be injected into a third vessel to begin a preheat stage for the third vessel. Alternatively, if the first vessel has already been emptied and refilled, the working fluid from the bottom of the second vessel can be injected into the first vessel to begin a new preheat stage in the first vessel.

Each of the vessels can be formed of walls which are impermeable to gas and liquids, except for dedicated inlet and outlets, up to and above operating temperatures to pyrolyze kerogen. Although other materials can be considered, non-limiting examples of suitable vessel materials can include steel, refractory metal alloys, ceramics, and the like. Vessels can be single walled, insulated, multi-layered, or the like and may optionally include various internal plenums, weirs, screens, internal baffles, or the like.

This process can be continued without the use of the surrogate working fluid. In some examples, cold working fluid used for the cooling stage of a vessel can be supplied from the bottom of a different vessel that is in the preheat stage. In further examples, hot working fluid can be supplied from the bottom of a vessel that has fully reached the production temperature. In still further examples, working fluid with an intermediate temperature can be supplied from a vessel that has partially reached production temperature. In certain examples, the working fluid at an intermediate temperature can be used to preheat another vessel; the hot working fluid can be used to sustain pyrolysis in a vessel that is in the pyrolysis stage, and cold working fluid can be used to cool a vessel in the cooling stage. In some examples, additional heat can be added to the working fluid at certain points in the process. However, the overall energy use and cost (and therefore $CO_2$ production) of this process can be much lower than other oil shale production processes. This is directly due to the use of a shale bed to cool and condense liquids from working gas and simultaneously capture and collect condensed hydrocarbon aerosols and capture mineral fines (adsorbed at shale particle surfaces), as compared to accomplishing these functions with an external heat exchanger/cooler, aerosol capture system, and liquid filtering and/or electrostatic precipitation system. The system captures heat from the working gas with these functions, and applies this heat towards requirements for heating shale to pyrolysis, as opposed to rejecting this heat to the surrounding environment, as is necessarily the case for external systems.

In another example, a working fluid can be injected into a first vessel containing particulate oil shale in a pyrolysis mode. The working fluid can have a temperature at or above a production temperature. The production temperature is a temperature that is sufficient to pyrolyze kerogen in the oil shale. The particulate oil shale in the first vessel forming a shale bed can have at least portion at a temperature at or above the production temperature. The working fluid can heat the oil shale to the production temperature and produce pyrolysis in the oil shale and exit the vessel with produced gas and condensed aerosols entrained in the working fluid. This working gas effluent can contain non-condensable and condensable components and condensed components in aerosol form. The temperature of the shale bed can be at a maximum at an entrance point of the hot working fluid, and at a minimum at an exit point of the working fluid. There can be some condensation of produced hydrocarbons in cooler downstream portions of the oil shale, and this condensed hydrocarbon liquid can be extracted at or near this exit point of the working fluid. Condensed hydrocarbon aerosols can also adsorb on shale particle surfaces and be removed from the gas flow. The effluent can concurrently flow out of the first vessel. The effluent can include the working fluid and optionally condensable hydrocarbon product and condensed hydrocarbon aerosols of produced liquid entrained in the working fluid (gas). The working fluid can be injected into a second vessel in preheat mode. When pyrolysis is completed in the first vessel, cold working gas can be injected into the first vessel, which can be heated by the hot shale, thereby also cooling the shale. When shale in the first vessel is sufficiently cooled, the first vessel can be emptied of spent shale and re-filled with raw shale ore in preparation for another pyrolysis cycle. This flow of hot gas produced by cooling the first vessel can be injected into a second vessel in preheat mode. The second vessel can contain particulate oil shale with an average temperature below the production temperature. The working fluid, with included non-condensable and condensable hydrocarbon components and liquid hydrocarbon aerosols, can further cool and condense and adsorb on the shale bed, and liquids can flow to the liquid collection point at or near an exit for the working fluid, simultaneously pre-heating the shale bed. As in the first vessel, the maximum temperature of the second vessel can be at an entrance point for the working fluid and the minimum temperature can be at an exit for the working fluid. Condensed liquid can be collected at or near this exit point. A second effluent can also flow concurrently out of the second vessel. The second effluent can include the working fluid and non-condensed hydrocarbon product and condensed hydrocarbon aerosols. This second effluent can then be heated to above the production temperature and introduced back in to the second vessel to heat the shale the rest of the way to the production temperature. This second vessel would now be in the pyrolysis mode. As working gas passes out of the second vessel, now in the pyrolysis mode, condensed liquids can be removed at or near the exit point, as described for the first vessel above. At this time, this working gas can proceed to preheat a third vessel and continue a sequence as described here. Optionally, this working gas can be injected into the first vessel, which has been emptied of spent shale and refilled with raw shale, to place this first vessel in preheating mode, in preparation for another pyrolysis cycle.

Another example can include three separate vessels that operate in three different modes. A first vessel can be in a pyrolysis mode. In this mode, a heated working fluid can be injected into the first vessel. The first vessel can contain particulate oil shale that is at an average temperature at or above the production temperature. The working fluid can be at a temperature above the production temperature. An effluent can flow out of the first vessel, the effluent including the working fluid, condensed hydrocarbon product, condensable hydrocarbon product, and non-condensable hydrocarbon, and optionally condensed hydrocarbon products. The effluent can be injected into a second vessel that is in preheating mode. In some cases, the condensed hydrocarbon products can be removed prior to introduction into the second vessel. The second vessel can contain particulate oil shale that has an average temperature below the production temperature. Liquid hydrocarbons can concurrently be collected from the first vessel. A second effluent can also concurrently flow out of the second vessel. The effluent can include the working fluid and non-condensed hydrocarbon product. The second effluent can be recycled to the first vessel. Advantageously, in some cases, the non-condensed hydrocarbon product is condensed when introduced into the second vessel. Spent oil shale can concurrently be emptied from a third vessel in an emptying and refilling mode. The spent oil shale has already been heated to the production temperature to pyrolyze the kerogen in the spent oil shale and then cooled below the production temperature and then optionally cooled additionally to facilitate handling.

In another example, the vessels can be operated sequentially in each of the three modes. This can allow for a semi-continuous process. This example can include three stages, and the vessels can switch to a different mode at the beginning of each stage. In a first stage, a working fluid can be injected into a first vessel. The first vessel can contain particulate oil shale. The working fluid can have a temperature above a production temperature, where the production temperature is a sufficient temperature to pyrolyze kerogen in the oil shale. The oil shale in the first vessel optionally can initially have an average temperature at or above the production temperature or optionally some portion of the oil shale in the first vessel can be at a temperature sufficient for pyrolysis. The first vessel can be in the pyrolysis stage at this point. An effluent can flow out of the first vessel and the effluent can be injected into a second vessel. The second vessel can contain particulate oil shale having an initial maximum temperature below the production temperature. The second vessel is now in the preheat stage. Liquid hydrocarbons can be collected from the second vessel. A second effluent can flow out of the second vessel. The second effluent can be recycled to the first vessel. Spent oil shale can be emptied from the third vessel, and the third vessel can be refilled with fresh oil shale. The second effluent can cool the oil shale in the first vessel, until the oil shale in the first vessel is cooled sufficiently to empty the first vessel. The vessels can then change modes in the second stage.

In the second stage, the second effluent can be at a temperature at or above the production temperature because the oil shale in the second vessel has heated up sufficiently by this point. The second effluent can be injected into the third vessel, which has just been filled with fresh oil shale. A third effluent can flow out of the third vessel, and the third effluent can be recycled to the second vessel. At the same time, the first vessel can be emptied and refilled with fresh oil shale. Liquid hydrocarbons can be recovered from the third vessel. The working fluid can continue to be injected into the third vessel until the average temperature of the oil shale in the third vessel reaches the production temperature, and until the oil shale in the second vessel has been substantially retorted and cooled below the production temperature.

In the third stage, the third effluent can be at or above the production temperature. The third effluent can then be injected into the first vessel to preheat the oil shale in the first vessel. Effluent from the first vessel can be at a lower temperature, and this effluent can be recycled to the third vessel to cool the oil shale in the third vessel. Liquid hydrocarbons can be collected from the first vessel. At the same time, the second vessel can be emptied and refilled with fresh oil shale. In some examples, these three stages can be repeated multiple times or indefinitely to provide a semi-continuous process for extracting hydrocarbons from oil shale.

It should be understood that the term "stage" refers to a condition of materials at any point within a vessel. As such, a single vessel may be operating entirely in a single stage or can often be operating in multiple stages simultaneously. For example, effluent will substantially always be below pyrolysis temperature, except in some cases the very last gas to exit the vessel when pyrolysis is complete in the bottom most shale. Such effluent can be used for preheating at its exit temperature, but will most often be reheated to above a pyrolysis temperature in order to produce pyrolysis in the top shale of the next vessel. When effluent gas is injected below the pyrolysis temperature, into the top of a second vessel, when that vessel has spent some time in the pyrolysis stage, this second vessel will be in both the pyrolysis stage and the cooling stage, with a the maximum temperature at an intermediate location down the height of the vessel. Over time, this vessel would have a growing upper portion operating in the cooling stage with a shrinking lower portion operating in the pyrolysis stage.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
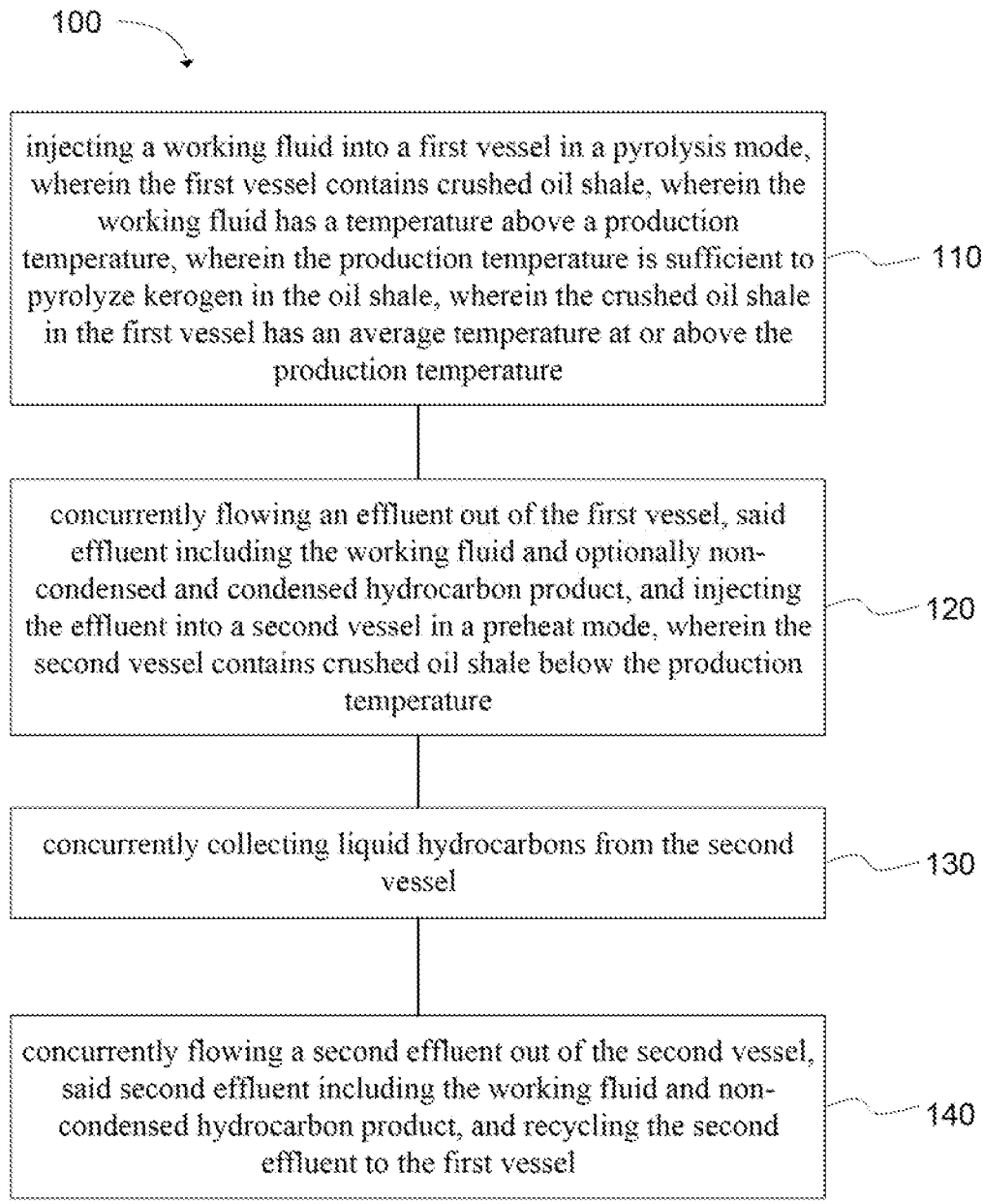
FIG. 1 is a flowchart illustrating an example method of recovering hydrocarbon products from oil shale in accordance with an example of the present invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

As used herein, "oil shale" refers to a sedimentary rock containing kerogen, which is a solid mixture of organic compounds. The kerogen can be converted to shale oil by heating the oil shale to a sufficient temperature to cause pyrolysis. Pyrolysis is a chemical process by which the kerogen breaks down into smaller hydrocarbon compounds.

As used herein, "hydrocarbonaceous material" refers to any hydrocarbon-containing material from which hydrocarbon products can be extracted or derived. For example, hydrocarbons may be extracted directly as a liquid, removed via solvent extraction, directly vaporized, by conversion from a feedstock material, or otherwise removed from the material. Many hydrocarbonaceous materials contain kerogen or bitumen which is converted to a flowable or recoverable hydrocarbon through heating and pyrolysis. Hydrocarbonaceous materials can include, but are not limited to, oil shale, tar sands, coal, lignite, bitumen, peat, and other organic rich rock. Thus, existing hydrocarbon-containing materials can be upgraded and/or released from such feedstock through a chemical conversion into more useful hydrocarbon products. Chemical conversion can include synthesis reactions, decomposition reactions or other reactions which result in chemically distinct product compounds. Such chemical conversions can be accomplished thermally, catalytically, and/or via addition of other chemical components.

As used herein, "spent hydrocarbonaceous material" and "spent oil shale" refer to materials that have already been used to produce hydrocarbons. Typically after producing hydrocarbons from a hydrocarbonaceous material, the remaining material is mostly mineral with the organic content largely removed. In some cases, spent oil shale can have a sufficient amount of residual hydrocarbon or carbon content that the spent oil shale can be burned in a combustor to generate additional heat.

As used herein, "lean hydrocarbonaceous material" and "lean oil shale" refer to materials that have a relatively low hydrocarbon content. As an example, lean oil shale can typically have from 1% to 8% hydrocarbon content by weight.

As used herein, "rich hydrocarbonaceous material" and "rich oil shale" refer to materials that have a relatively high hydrocarbon content. As an example, rich oil shale can typically have from 12% to 27% hydrocarbon content by weight, and some cases higher.

Many examples described herein involve processing of oil shale. In some cases, these examples can also be made and used with other types of hydrocarbonaceous material other than oil shale. For example, hydrocarbonaceous material such as coal, tar sands, and the like can also be subjected to this process.

As used herein, whenever any property is referred to that can have a distribution between differing values, such as a temperature distribution, particle size distribution, etc., the property being referred to represents an average of the distribution unless otherwise specified. Therefore, "particle size of the particulate oil shale" refers to an average particle size, and "temperature of the particulate oil shale" refers to an average temperature of the oil shale.

In particular, the "average temperature" of particulate oil shale in a vessel is referred to herein. The average temperature can refer to the spatial average temperature within the vessel. In practice, this average temperature may be measured by measuring the local temperature at multiple locations within the vessel and then calculating the average of the measurements. Taking a greater number of temperature measurements in a greater number of locations can provide a more accurate estimate of the actual average temperature in the vessel. In some examples, a limited number of temperature measurements can be sufficient to provide a good estimate of the average temperature, such as 3, 4, 5, 10, 20, or another number of temperature measurements. In certain examples, temperature measurements can be taken at random locations within the vessel, or at specific locations that are evenly spaced, or at another set of locations. In some examples, the temperature can be measured at locations spaced vertically over the height of the vessel, and the temperature of the oil shale in the vessel can vary primarily in the vertical direction.

As used herein, "production temperature" can refer to any temperature at which hydrocarbons can be produced from oil shale. In some cases, hydrocarbons can be extracted from oil shale across a range of temperatures. The production temperature can be selected from this range of temperatures. In various examples, the production temperature can be selected to optimize variables such as the amount of energy required to heat the oil shale, the speed at which oil can be extracted from the oil shale at the production temperature, the quality of oil extracted from the oil shale at the production temperature, the occurrence of side reactions at the production temperature, and other variables. In certain examples, the production temperature can be selected within the range of about 700° F. to about 900° F. (about 371° C. to about 482° C.).

As used herein, "preheat mode" refers to a mode or stage in the operation of an oil shale processing vessel. In this mode, the oil shale in the vessel initially has an average temperature below the production temperature. In certain examples, the oil shale can initially have a uniform temperature, and the temperature can be at or near ambient temperature. During operation in preheat mode, a working fluid is injected into the vessel to heat the oil shale. Thus, the temperature of the oil shale can rise during operation in preheat mode. In some examples, the oil shale in the vessel can have a temperature profile that changes dynamically, with oil shale near the working fluid injection point heating up first, followed by oil shale farther from the injection point. This progressive temperature profile shift is described in more detail below.

As used herein, "pyrolysis mode" refers to a mode or stage in the operation of an oil shale processing vessel. This mode follows after preheat mode. In pyrolysis mode, the oil shale in the vessel initially has an average temperature that is at the production temperature. Because the oil shale has an average temperature at the production temperature, oil can be produced from the oil shale in this mode or stage. Liquid and gaseous hydrocarbons can be collected from the vessel during in this mode. As described in more detail below, an effluent from a separate vessel can also be injected into a vessel in pyrolysis mode. The separate vessel, from which the effluent flows, can be in the preheat mode. In this case, the effluent from the preheat mode vessel can have a temperature that is lower than the production temperature. Injecting this effluent into the pyrolysis mode vessel can have the effect of cooling the oil shale in the pyrolysis mode vessel. The oil shale in the vessel can have a dynamically changing temperature profile, where the oil shale may begin at a nearly uniform temperature at or near the production temperature and then the oil shale near the effluent injection point can begin to cool, followed by oil shale farther from the injection point. Eventually, in some examples, all of the oil shale in the vessel can be cooled by the effluent that is being injected from the preheat mode vessel. Alternatively, the effluent injected into the pyrolysis mode vessel can be heated to near the production temperature. In this case, the pyrolysis mode vessel can be maintained at the production temperature until pyrolysis is complete leaving spent shale.

In other examples, a "cooling mode" can refer to a vessel that contains oil shale that has been substantially retorted and which is being cooled by injecting cooler gas into the vessel. Substantially retorted includes oil shale that has at least 75% pyrolyzable materials pyrolyzed. In some examples, the spent oil shale can be at the production temperature at the beginning of the cooling stage. Cooler gas, such as the effluent from the vessel in preheat mode, can be injected to cool the oil shale to a temperature at which the oil shale can be safely removed from the vessel.

As used herein, "emptying and refilling mode" can refer to another mode, or stage, in the process of producing hydrocarbons from oil shale. In this mode, the vessel can initially contain spent oil shale that has previously gone through the pyrolysis mode. Such spent oil shale is typically substantially devoid of kerogen. This spent oil shale can be at least partially cooled by the effluent that flowed into the vessel during the pyrolysis stage or during the cooling stage. Then, in the emptying and refilling mode, the spent oil shale can be removed from the vessel. Fresh oil shale can then be introduced into the vessel. After the vessel is filled with fresh oil shale, the vessel can be switched to preheat mode and the entire sequence of preheat mode, pyrolysis mode, cooling mode, and emptying and refilling mode can begin again.

As used herein, "substantially stationary bed" refers to a particulate bed of hydrocarbonaceous materials which is not mixed or fluidized during recovery of hydrocarbon product. This is meant to delineate from fluidized bed processes in which particulates become suspended in a turbulent fluid and thoroughly mixed and "moving bed" processes, where the oil shale ore moves through a hot pyrolysis zone, either by a substantially horizontal transport system, or vertically by gravity. As a consequence "substantially stationary" refers to a static bed of material which does not move during heating except for some minor settling and subsidence during hydrocarbon production.

As used herein, "working fluid" can refer to a fluid that is injected into a vessel for the purpose of transferring heat, although the working fluid can also perform other functions in some examples. In some cases, a hot working fluid can contact cooler oil shale, and the working fluid can transfer heat to the oil shale to heat up the oil shale. In other cases, the working fluid can be cooler and the oil shale can be hotter. In such cases, the working fluid can remove heat from the oil shale to cool the oil shale. In certain examples, the working fluid can include all fluids that are injected into a vessel. For example, if multiple fluid streams are injected into a vessel then all of these streams can be "working fluid." However, in other examples, the "working fluid" can refer to an individual stream. For example, a vessel in preheat mode can have a working fluid injected into the vessel. Additionally, an effluent stream from another vessel in pyrolysis mode can be recycled to the vessel in preheat mode. In certain examples, the working fluid that is injected into the preheat mode vessel can be a separate stream from the effluent that is also injected into the preheat mode vessel. Thus, two streams can be injected into the preheat mode vessel. In this example, the working fluid can be heated by some heat source such as a gas turbine, hydrocarbon fuel combustor, electric resistance heater, or any other heat source with a suitable means to heat a working gas stream, such as direct contact or a gas-to-gas heat exchanger. In one example, the hot combustion gas can be produced using a gas turbine that simultaneously produces electricity. For example, the gas turbine can be an industrialized gas turbine.

In alternative examples, the effluent stream can be the only stream that is injected into the preheat mode vessel. This can be the case when the effluent stream has sufficient heat to preheat the vessel without an additional heated working fluid stream. In this case, the effluent stream that is injected into the vessel can be referred to as the "working fluid" and also referred to as the effluent that is recycled from the pyrolysis mode vessel. Accordingly, "working fluid" can refer to a separate stream, or to a combination of streams, or to a stream that may also have another name such as an effluent stream. Although described in more detail below, a working fluid can be a combustion gas (i.e. hot combustion products from a boiler, turbine, combustor, or the like), recovered non-condensable hydrocarbon product, or other fluids.

It is noted that, as used in this specification and in the appended claims, the singular forms "a," "an," and "the" include plural referents unless the context clearly dictates otherwise. Thus, for example, reference to "a region" includes one or more of such features, reference to "a particle" includes reference to one or more of such elements, and reference to "producing" includes reference to one or more of such steps.

As used herein, the terms "about" and "approximately" are used to provide flexibility, such as to indicate, for example, that a given value in a numerical range endpoint may be "a little above" or "a little below" the endpoint. The degree of flexibility for a particular variable can be readily determined by one skilled in the art based on the context. However, unless otherwise enunciated, the term "about" generally connotes flexibility of less than 2%, and most often less than 1%, and in some cases less than 0.01%.

As used herein, the term "substantially" refers to the complete or nearly complete extent or degree of an action, characteristic, property, state, structure, item, or result. The exact allowable degree of deviation from absolute completeness may in some cases depend on the specific context. However, the nearness of completion will generally be so as to have the same overall result as if absolute and total completion were obtained. "Substantially" refers to a degree of deviation that is sufficiently small so as to not measurably detract from the identified property or circumstance. The exact degree of deviation allowable may in some cases depend on the specific context. The use of "substantially" is equally applicable when used in a negative connotation to refer to the complete or near complete lack of an action, characteristic, property, state, structure, item, or result.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a device per se, other device, system, and/or method embodiments are also included in such discussions, and vice versa.

Furthermore, various modifications and combinations can be derived from the present disclosure and illustrations, and as such, the following figures should not be considered limiting.

Staged Oil Shale Processing Vessels

In various examples, the methods and systems described herein can have any combination of the following features.

Oil shale offers a potentially large resource for deriving liquid hydrocarbons that can be useful as fuel or feedstocks. However, extracting hydrocarbons from oil shale can often involve a large energy expenditure (and attendant $CO_2$ production), which can make oil shale less appealing as an energy source. The methods described herein can be used to reduce the energy cost (and attendant $CO_2$ production) and overall cost of processing oil shale compared to many other processes. Specific costs that can be associated with oil shale processing can include: energy for heating oil shale up to a production temperature, energy for cooling spent oil shale, energy for transporting oil shale, including loading and unloading oil shale from retort vessels, energy for condensing hydrocarbon products, energy for pumping working fluid, energy required to remove/filter condensed liquid mists from gas streams, and energy required to remove/filter mineral fines from gas streams and liquids, and the cost of equipment for performing all these functions. The methods described herein can help to reduce many, if not all, of these costs.

FIG. 1 is a flowchart illustrating an example method 100 of recovering hydrocarbon products from oil shale, in accordance with the present disclosure. This method includes: injecting a working fluid into a first vessel in a pyrolysis mode, wherein the first vessel contains particulate oil shale, wherein the working fluid has a temperature at or above a production temperature, wherein the production temperature is sufficient to pyrolyze kerogen in the oil shale, wherein the particulate oil shale in the first vessel has an average temperature at or above the production temperature 110. The method also includes concurrently flowing an effluent out of the first vessel, said effluent including the working fluid and optionally non-condensed and condensed hydrocarbon product, and injecting the effluent into a second vessel in a preheat mode. The second vessel contains particulate oil shale having an average temperature below the production temperature 120. As a result, the second vessel performs as a heat exchanger and condenser so as to capture heat from the effluent sufficient to increase the average temperature of the particulate oil shale and to condense at least a portion of the condensable hydrocarbon product. This condensed hydrocarbon product increases a volume of the condensed hydrocarbon product that can be collected. As liquid product passes over the particulate bed as a film over particle surfaces, mineral fines entrained in the effluent are at least partially removed from the effluent via filtering and adsorption to the particulate oil shale as described previously. Similarly, aerosolized condensed hydrocarbons which can be present in the effluent as entrained mists can be consolidated with liquid condensed hydrocarbons through contact with the particulate bed. Liquid hydrocarbons can be concurrently collected from the second vessel 130, including the condensed hydrocarbon product.

The method can further include concurrently flowing a second effluent out of the second vessel, said second effluent including the working fluid and non-condensed hydrocarbon product, and recycling the second effluent to the first vessel 140. Note that the particulate oil shale is maintained as a substantially stationary bed during heating and production of hydrocarbons.

Figure 2:
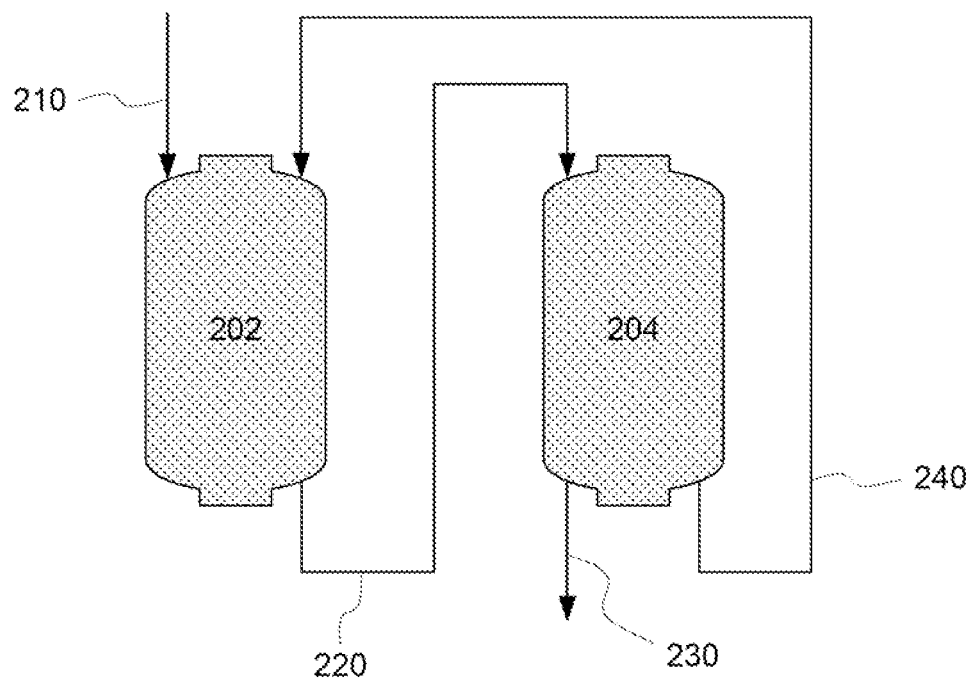
FIG. 2 is a schematic illustration of an example system for performing a method of recovering hydrocarbon products from oil shale in accordance with an example of the present invention.

In one specific example, FIG. 2 shows a schematic diagram of a system for performing a method of recovering hydrocarbon products from oil shale. The figure shows a first vessel 202 and a second vessel 204. The first vessel is in pyrolysis mode, and the second vessel is in preheat mode. A working fluid 210 is injected into the first vessel. The working fluid can have a temperature that is equal to or higher than the production temperature. Typically, the working fluid can include methane and/or natural gas that has been heated to a temperature at or above the production temperature.

As mentioned above, the production temperature can be a temperature that is sufficient to pyrolyze kerogen in the substantially stationary bed of oil shale and produce hydrocarbons that can be collected. At the beginning of the preheat stage, the oil shale can have an average temperature that is below the production temperature. As the working fluid is injected into the preheat vessel, over time the oil shale will heat up to approach the production temperature. This figure also shows an effluent 220 that flows out of the first vessel. The effluent stream is injected into the second vessel. The second vessel contains oil shale that is initially below the production temperature. Thus, the oil shale in the second vessel is preheated by the hot effluent stream from the first vessel.

Since conversion of kerogen to useful hydrocarbons via pyrolysis is endothermic heat is required to drive the decomposition of the complex hydrocarbons of kerogen. The total minimum theoretical heat to accomplish pyrolysis is the sum of the heat required to heat the ore (e.g. mineral phase and kerogen) to the production temperature plus the heat to actually accomplish pyrolysis (i.e. heat of reaction). After pyrolysis, the working gas still retains significant heat value, as well as the spent shale. In order to cool the spent shale to allow for removal and handling, heat can be removed. This can be done with a cooled working gas. Although cooling the working gas can be done in an external heat exchanger, that heat is rejected to the surrounding environment and lost to the process. Alternatively, the hot working gas can pass through cool raw shale, cooling the working gas and also beneficially heating (preheating) the raw shale. This captures the heat in the working gas, and applies it to the heat requirements of the process rather than rejection to the environment. This can result in a very significant heat/energy requirement reduction and the associated reduction in $CO_2$ production, e.g. theoretically over 50% reduction in $CO_2$ production. Net reductions will be the sum of these heat rejection reductions and any energy required to account for extra gas handling/pumping and other internal system losses.)

Liquid hydrocarbons 230 are collected from the second vessel. Notably, the liquid hydrocarbons can include condensed hydrocarbon product from the first vessel that has been filtered of mineral fines, as well as newly condensed hydrocarbon product which condensed within the second vessel (e.g. operating as a condenser). Thus, the unused het from the effluent of the first vessel can be advantageously used within the second vessel to both preheat the particulate oil shale while also condensing product from the effluent and working fluid stream. Accordingly, a second effluent 240 can flow out of the second vessel and be recycled into the first vessel. The second effluent can include mostly gas and vapor components, such as non-condensed hydrocarbons.

Figure 3:
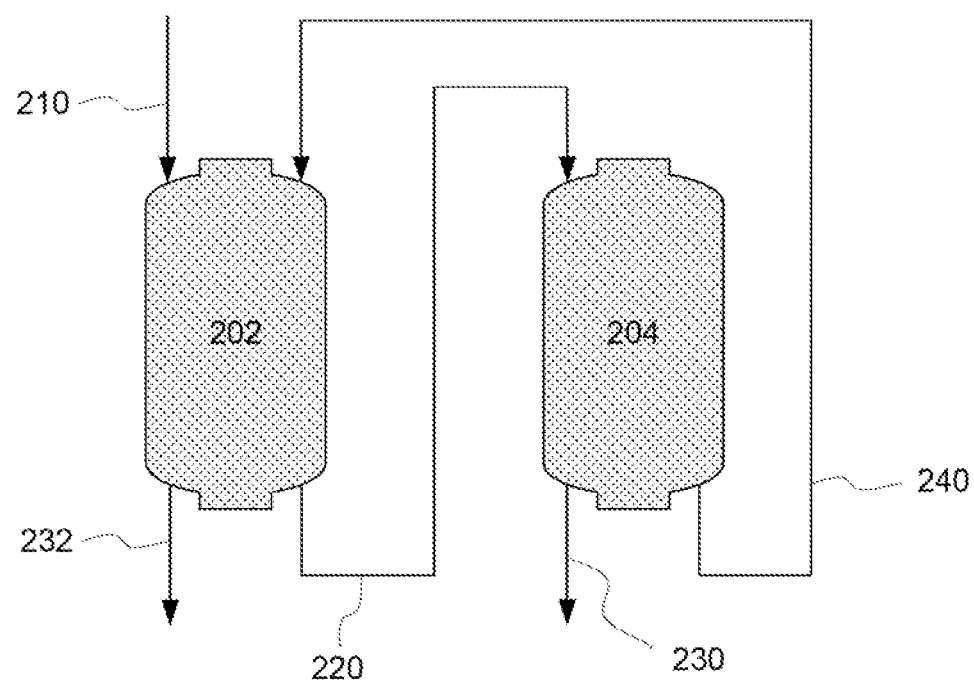
FIG. 3 is a schematic illustration of another example system for performing a method of recovering hydrocarbon products from oil shale in accordance with an example of the present invention.

When the effluent stream includes non-condensed hydrocarbons, in some examples the non-condensed hydrocarbons can condense after the effluent stream is injected into the second vessel. As mentioned above, the second vessel can contain oil shale below the production temperature. When the effluent stream comes in contact with this colder oil shale, the non-condensed hydrocarbons may condense to form liquid hydrocarbon products. Accordingly, in some examples, these liquid hydrocarbons can be collected from the second vessel. At the same time, some liquid hydrocarbons can be in the liquid state in the first vessel as well. Therefore, in some examples liquid hydrocarbons can be collected from the first vessel and the second vessel. FIG. 3 shows an example in which liquid hydrocarbons are collected in this way. This example also includes a first vessel 202 and a second vessel 204. A working fluid 210 is injected into the first vessel, an effluent 220 flows out of the first vessel and into the second vessel, and a second effluent 240 flows out of the second vessel to be injected into the first vessel. This example also includes a liquid hydrocarbon stream 230 flowing out of the second vessel, just as in FIG. 2. However, the example of FIG. 3 also includes an additional liquid hydrocarbon stream 232 flowing out of the first vessel. This stream can include hydrocarbons that have a higher boiling point so that they remain in the liquid state in the first vessel. Accordingly, in some examples the liquid hydrocarbon stream 232 can include mostly higher-boiling hydrocarbons that are in a liquid state at the production temperature, while the additional liquid hydrocarbon stream 230 can include mostly lower-boiling hydrocarbons that were in vapor form in the effluent and which condense in the second vessel. In these configurations, the system can avoid or reduce loads on a heat exchanger or a condenser.

It should be noted that pyrolysis of kerogen in the oil shale does not occur exclusively in the pyrolysis mode, but some pyrolysis can begin even in the preheat mode, and can continue in the cooling mode. Therefore, the vessels can begin to produce some hydrocarbon products even during preheat mode. Liquid hydrocarbon products produced during preheat mode can be collected from the second vessel in liquid hydrocarbon stream 230, as shown in FIG. 3. Alternatively, if there is no liquid hydrocarbon stream collected from the first vessel, then any hydrocarbons produced in the first vessel can flow to the second vessel in the effluent stream 220, as shown in FIG. 2.

Figure 4:
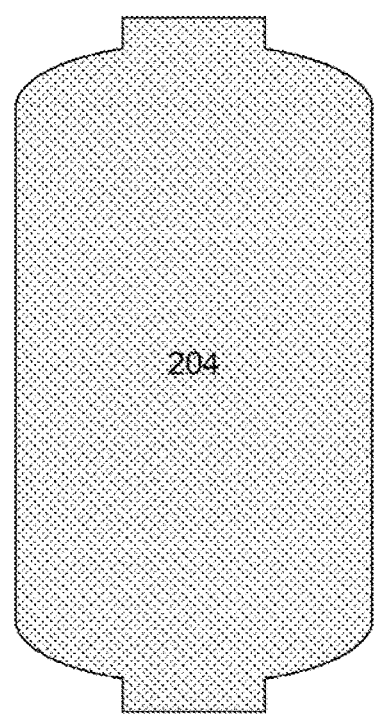
FIG. 4 is a graph illustrating temperature profiles of a vessel in pre-heating mode in accordance with an example of the present invention.
Figure 4:
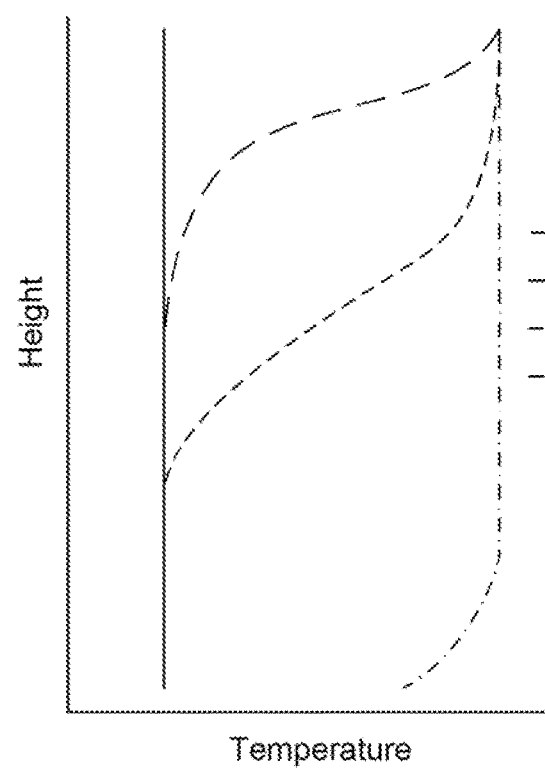

As mentioned above, the vessels can have dynamically changing temperature profiles in the various modes. An example of the changing temperature profile is shown in FIG. 4. This figure shows a graph of the local temperature by height in the second vessel 204, which is in preheat mode. At the beginning of operation, the initial temperature of the oil shale is a uniform cold temperature. In this example, the heated working fluid is injected at the top of the vessel. Therefore, as time passes, the oil shale near the top of the vessel heats up first. The graph shows the temperature at 1 hour, 2 hours, and 4 hours. After each time interval, a greater fraction of the oil shale has heated up to approach the temperature of the working fluid. Eventually, the oil shale in the vessel will heat up to the point that the average temperature is at the production temperature. As mentioned above, the production temperature can be selected to be any temperature that is sufficient to pyrolyze kerogen in the oil shale. In some examples, the working fluid can be injected at a temperature that is above the production temperature. The rates at which oil shale heats up and at which these curves migrate downward through the vessel can depend on a variety of factors such as, but not limited to, void space of the bed, porosity of the shale, flow rate of working fluid, composition of the oil shale, rate of heat loss from vessel walls, and the like. For example, a bed void space of 15 to 65%, and often 30 to 50% can be desirable.

Figure 5:
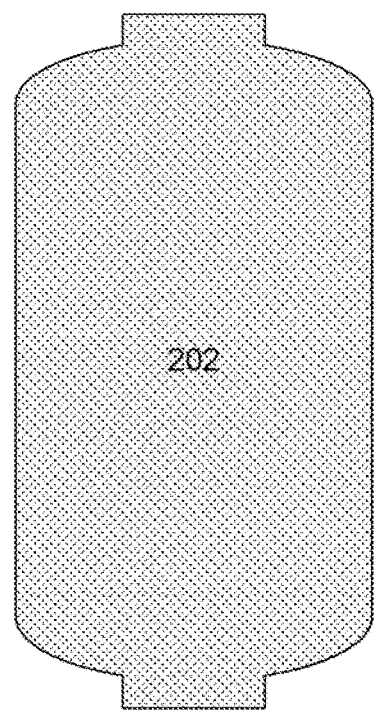
FIG. 5 is another graph illustrating temperature profiles of a vessel in production or cooling mode in accordance with an example of the present invention.
Figure 5:
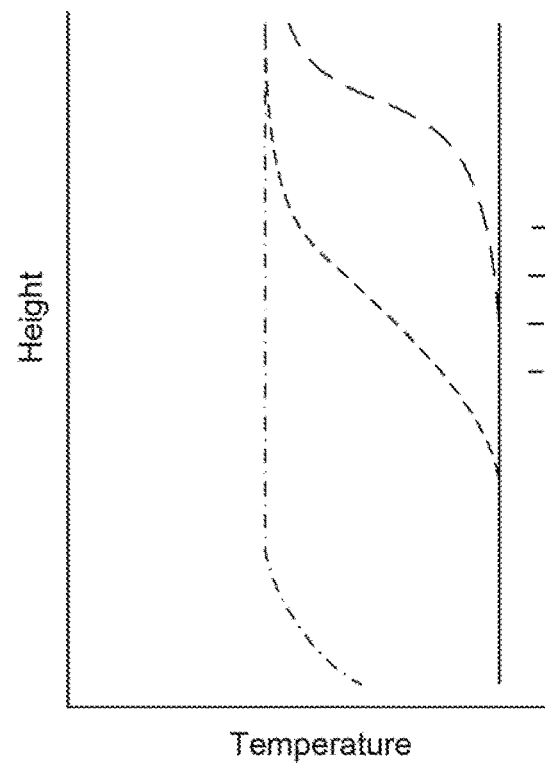

FIG. 5 shows a similar graph of the temperature profile in the first vessel 202, which is in pyrolysis mode. At the beginning of operation in pyrolysis mode, the oil shale has a uniform or nearly temperature at about the production temperature. Effluent from the second vessel is then injected into the first vessel. The effluent from the second vessel can be cooler, which can reduce the temperature of the oil shale in the first vessel. The graph shows the initial temperature profile and the temperature profile after 1 hour, 2 hours, and 4 hours. At the end of the pyrolysis stage, the oil shale in the first vessel can be at least partially cooled. After this cooling, the oil shale can be ready to empty from the vessel in the emptying and refilling stage. In some examples, this cooling process can also be referred to as a "cooling mode," while the pyrolysis mode can be a period at which most of the oil shale in the vessel remains at or above the production temperature.

As shown in FIG. 5, the oil shale in the pyrolysis mode or cooling mode vessel can begin to cool because of the cooler effluent that is being injected into the vessel. However, a significant fraction of the oil can remain at the production temperature for a period of time before cooling below the production temperature. Therefore, hydrocarbons can continue to be produced from the oil shale that is at the production temperature during this time period. Additionally, in some examples the pyrolysis mode can include a time period during which the oil shale remains at or above the production temperature until the oil shale in the vessel is substantially completely retorted, so that the oil shale becomes spent oil shale. The spent oil shale can then be cooled as shown in FIG. 5. It should be noted that the graphs in FIG. 4 and FIG. 5 are merely one example, and the temperature profiles in oil shale vessels can vary depending on a variety of factors. Additionally, the temperature profiles shown in FIG. 4 and FIG. 5 are somewhat simplified in that the temperature is assumed to vary in the height dimension and to be uniform in the horizontal dimensions. In some examples, the temperature of the oil shale can be nearly uniform in the horizontal dimensions, but in practice some lateral variation in temperature can occur especially near vessel walls. Temperature uniformity in the horizontal directions can be increased by using certain equipment such as distribution plates or other such equipment for injecting working fluid into the vessels. Rates of cooling depend on a variety of factors such as, but not limited to, inlet temperature of the working fluid, degree of pyrolysis, oil shale organic content, void space, and porosity of spent shale. For example, as kerogen is converted to liberated hydrocarbon products, the spent shale no longer draws heat during pyrolysis. Conversely, although mitigated, some collapse of oil shale structure can occur due to lithostatic pressure as kerogen is removed. Such collapse can result in a lower void space and lower convective flow.

The methods described above can reduce the energy cost of oil shale processing in several ways. First, a certain amount of energy may be used to heat the oil shale in the vessel in the preheat mode. However, as explained above, an effluent stream from the first vessel can be injected into the second vessel in preheat mode. Because the first vessel contains oil shale that is at a higher temperature, the effluent will also be at a higher temperature. Therefore, this effluent stream will add heat to the oil shale in the second vessel, effectively reducing the amount of additional energy that is added to preheat the oil shale. As shown in FIG. 5, the oil shale in the first vessel cools from the top down (assuming that the working fluid is injected at the top of the vessel). Therefore, the oil shale near the bottom of the first vessel remains at a high temperature throughout most of the pyrolysis stage. Accordingly, the effluent from the first vessel will be at a high temperature near the production temperature for most of the operation stage, providing a good source of heat to help preheat the oil shale in the second vessel.

Conversely, the effluent from the second vessel is at a low temperature throughout most of the operation stage. This low temperature effluent is injected into the first vessel to cool the oil shale in the first vessel. Cooling the spent oil shale after producing hydrocarbons is a task that is often performed before disposing of spent oil shale. By using the effluent from the second vessel to cool the spent oil shale in the first vessel, this task can be completed without any additional energy or equipment cost.

The oil shale in the second vessel, while being preheated in order to produce hydrocarbons therefrom, can also act as a condenser to condense hydrocarbons that were in the effluent stream from the first vessel. As mentioned above, the effluent from the first vessel may include non-condensed hydrocarbons. Normally, a condenser can be used to condense these hydrocarbons. However, methods described herein can utilize the cooler oil shale in the second vessel as a condenser. The hydrocarbons condensed by the oil shale in the second vessel can be easily collected from the second vessel. In some examples, this can eliminate the cost of a separate condenser. In some cases, a separate condenser can still be used, but would be significantly smaller than if it were performing the entire condensing load. At the same time, when hydrocarbons condense in the oil shale, the latent heat of condensation can add energy to the oil shale to help preheat the oil shale.

Accordingly, the methods described herein can provide a way to heat oil shale sufficiently to produce hydrocarbons, cool the oil shale, and condense hydrocarbon products while minimizing the amount of heat that is lost to the atmosphere and reducing the overall cost of the process. The elevated local pressure and high working gas sweep rate can be used to manage local vapor-liquid equilibrium. For example, components of the produced liquid evaporate and are carried away from their formation site at a much lower temperature than would be the case for a single reactor vessel configuration. More specifically, when reaction components are carried away from a reaction site (e.g. surface of shale particles and immediate environment) the local partial pressure of those components is reduced. Effectively, the local humidity of those components is reduced and under those conditions evaporation increases. Therefore, the temperature for a given evaporation rate is reduced. As an example, the reduction in the temperature required for a given evaporation rate may be reduced by around 100° F.

As mentioned above, the production temperature used in these methods can be a temperature sufficient to pyrolyze kerogen in the oil shale. In some examples, the production temperature can be from about 680° F. to about 900° F. (about 360° C. to about 482° C.), and in some cases from about 710° F. to 800° F., and generally no more than 1000° F. In further examples, a working fluid can be injected into a vessel in preheat mode, and the working fluid can be above the production temperature. The working fluid can be at a temperature that is slightly above or well above the production temperature. For example, the working fluid can be from about 1° F. to about 100° F. (about 0.6° C. to about 56° C.) above the production temperature in some examples. In certain examples, the working fluid can be injected into the preheat mode vessel at a temperature from about 701° F. to about 1000° F. (about 372° C. to about 538° C.).

The temperature of the effluent stream flowing out of the preheat mode vessel can vary depending on the temperature of the oil shale in the preheat mode vessel. This temperature can change over time as the preheat stage progresses. Initially, the oil shale in the vessel can have a uniform, cold temperature and the effluent can have nearly the same temperature. Over time, the temperature of the effluent can tend to rise. At the end of the preheat stage, the temperature of the effluent may approach the production temperature or the temperature of the working fluid in some examples. In some examples, the effluent stream from the preheat mode vessel can have a temperature from about 32° F. to about 900° F. (about 0° C. to about 482° C.).

The effluent stream that flows out of the first vessel (the pyrolysis mode vessel) can also have a temperature that changes over time. In some examples, the effluent stream can initially have a temperature that is at or near the production temperature, because the oil shale in the pyrolysis mode vessel can have a temperature at the production temperature. As the oil shale cools, the temperature of the effluent stream can decrease. However, in some examples, the temperature of the effluent stream can be near the production temperature throughout most of the pyrolysis stage. In some examples, the effluent stream that flows out of the pyrolysis mode vessel can have a temperature from about 100° F. to about 900° F. (about 38° C. to about 482° C.). In further examples, heaters or heat exchangers can be added to the various streams at various locations in order to affect the temperatures of the streams. Some such arrangements are described in more detail below.

The working fluid that is injected into the first vessel can have a variety of compositions. The most chemically simple working gas composition includes only products from the pyrolysis process. Alternatives include combustion gasses, imported hydrocarbon gasses such as methane and natural gas, $CO_2$, steam, or combinations thereof. In a particular example, the working fluid can be hot combustion gas. These gasses may include oxygen which must be removed in order to avoid degradation of the chemistry of the produced oil.

In some examples, the working fluid can be injected into the first vessel at a flow rate that can allow the oil shale in the second vessel to be preheated in a desired amount of time. In certain examples, the working fluid can be a separate fluid stream from the second effluent stream that is recycled from the second vessel. Both of these streams can be injected into the first vessel. In some cases, the term "working fluid" can refer to both of these streams, while in other cases the "working fluid" can refer to the stream that is not the second effluent stream. In some examples, the second effluent stream can be the only stream entering the first vessel. Therefore, this single stream can also be referred to as the working fluid. Accordingly, in some examples, the vessel can switch from preheat mode to pyrolysis mode after a time period of about 1 hour to about 48 hours.

Many of the examples described herein show working fluid being injected into a top portion of the vessels, while effluents flow out of a bottom portion of the vessels. However, in some examples these can be reversed and working fluid can be injected in the bottom of the vessels while effluent flows out the top of the vessels. In certain examples, the effluent streams can be removed from an opposite end of the vessel from where fluid is injected into the vessel. In this way, working fluid that is injected into the vessel can have an opportunity to flow through and contact the entire body of oil shale inside the vessel before flowing out in the effluent stream.

Figure 6:
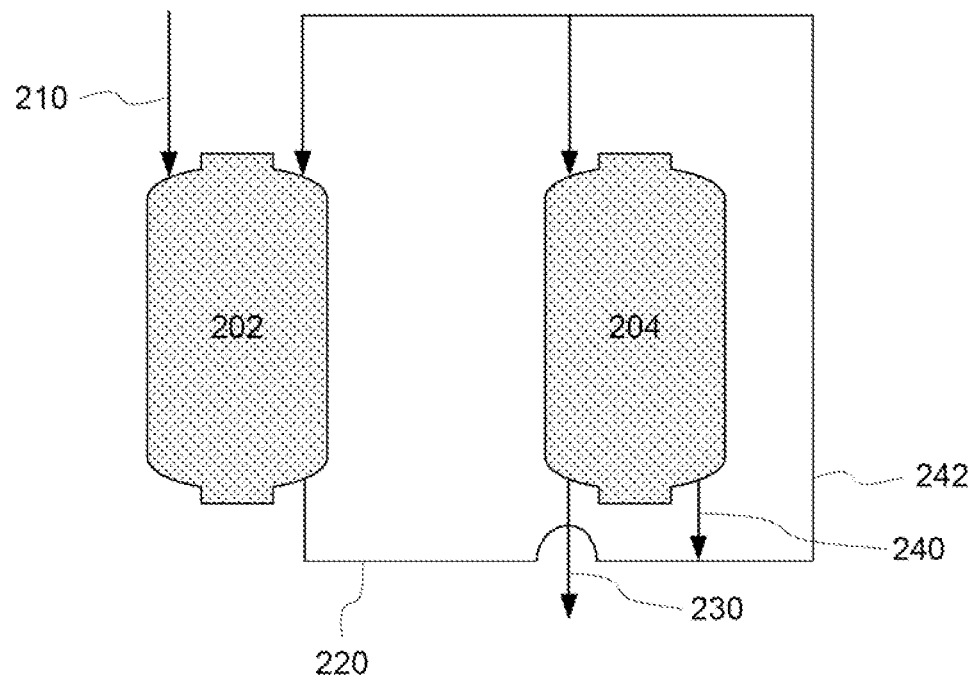
FIG. 6 is a schematic illustration of another example system for performing a method of recovering hydrocarbon products from oil shale in accordance with an example of the present invention.

In addition to the examples shown in FIG. 2 and FIG. 3, a variety of additional arrangements can be used with additional heating and mixing of the various working fluid and effluent streams. Another example is shown in FIG. 6. In this example, a working fluid 210 is injected into a first vessel 202. An effluent stream 220 flows out of the first vessel. However, instead of flowing directly into the second vessel, the effluent stream first mixes with the second effluent stream 240 from the second vessel. This forms a combined effluent stream 242. A portion of this combined effluent stream then flows into the second vessel, and another portion of the combined effluent stream flows into the first vessel.

Figure 7:
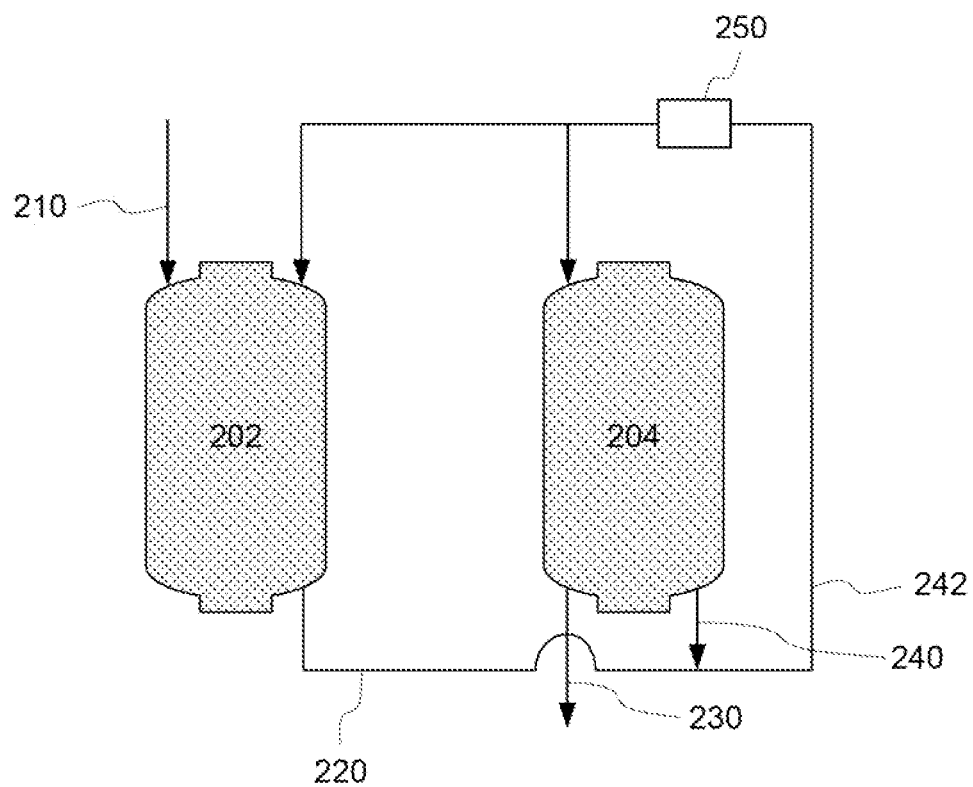
FIG. 7 is a schematic illustration of another example system for performing a method of recovering hydrocarbon products from oil shale in accordance with an example of the present invention.

FIG. 7 shows an example in which a working fluid 210 is injected into the first vessel 202 again. In this example, an effluent stream 220 flows out of the first vessel and mixes with a second effluent stream 240 from the second vessel to form a combined effluent stream 242. In this example, the combined effluent stream is heated by a heater 250 before the combined stream splits and flows to the first and second vessels. Heating the combined stream can increase the heat going to the first vessel, which can extend the pyrolysis time of the first vessel. The added heat can also increase the heat for preheating the oil shale in the second vessel. In various examples, the heater can be heat exchanger, an electrical resistance heater, a hydrocarbon combustion source producing hot combustion product gas, or a combination thereof. A heat exchanger, if used, can derive heat from a heat source such as the same heat source that produces the working fluid. In some examples, the heater can add a sufficient amount of heat to the combined effluent stream so that the temperature of the combined effluent stream is within the production temperature range.

Figure 8:
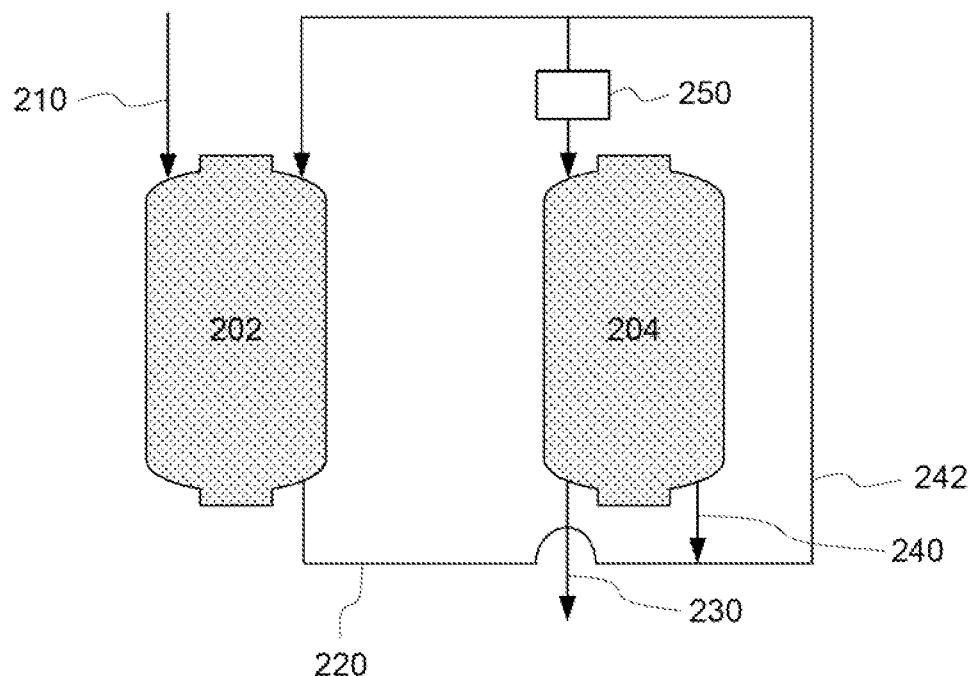
FIG. 8 is a schematic illustration of another example system for performing a method of recovering hydrocarbon products from oil shale in accordance with an example of the present invention.

FIG. 8 shows another example. In this example, a working fluid 210 is again injected into the first vessel 202. An effluent 220 flows out of the first vessel. The effluent mixes with a second effluent 240 that flows out of the second vessel, forming a combined effluent stream 242. The combined effluent stream splits and a portion of the stream is injected into the first vessel and another portion is injected into the second vessel. However, in this example a heater 250 heats the portion that is injected into the second vessel. Liquid hydrocarbons 230 are also collected from the second vessel.

Figure 9:
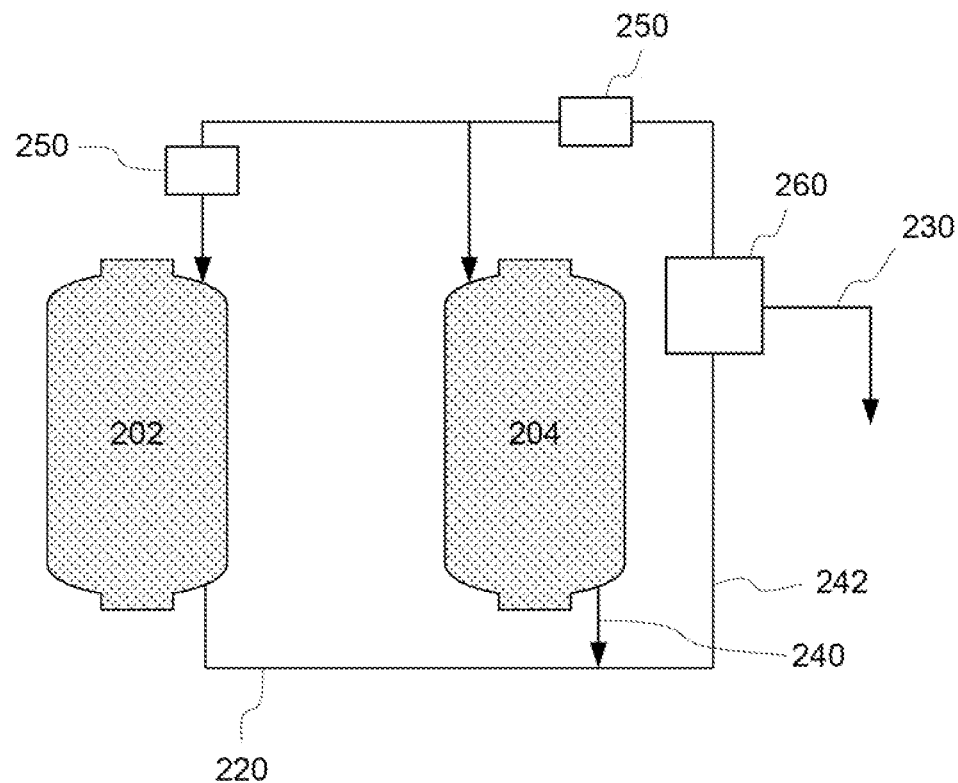
FIG. 9 is a schematic illustration of another example system for performing a method of recovering hydrocarbon products from oil shale in accordance with an example of the present invention.

FIG. 9 shows another example. In this example, the working fluid that is injected into the first vessel 202 is actually a portion of the combined effluent stream 242. This example does not include a separate working fluid stream that is injected in addition to the combined effluent stream. An effluent stream 220 from the first vessel mixes with a second effluent stream 240 from the second vessel 204 to form the combined effluent stream. This example does not include a liquid hydrocarbon stream collected directly from the second vessel. However, the combined effluent stream flows to a separator 260, which separates a liquid hydrocarbon stream 230 from the combined effluent stream. The combined effluent stream, without the liquid hydrocarbons, then flows to a heater 250 that heats the combined effluent stream. After the heater, the combined effluent stream splits and a portion of the stream is injected into the second vessel. Another portion of the stream flows to a second heater 252, which heats this portion of the stream to a higher temperature. This portion of the stream is then injected into the first vessel.

Figure 10:
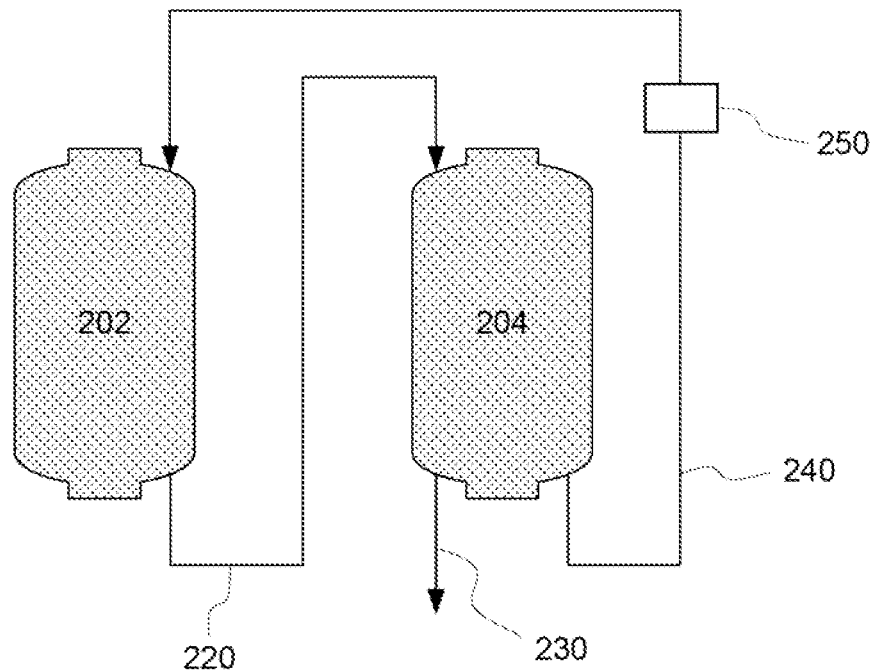
FIG. 10 is a schematic illustration of another example system for performing a method of recovering hydrocarbon products from oil shale in accordance with an example of the present invention.

Another example is shown in FIG. 10. In this example, the working fluid injected into the first vessel 202 is the second effluent stream 240 that flows out of the second vessel 204. An effluent stream 220 flows out of the first vessel and into the second vessel. Liquid hydrocarbons 230 are collected from the second vessel. The second effluent stream flows out of the second vessel and flows to a heater 250.

Figure 11:
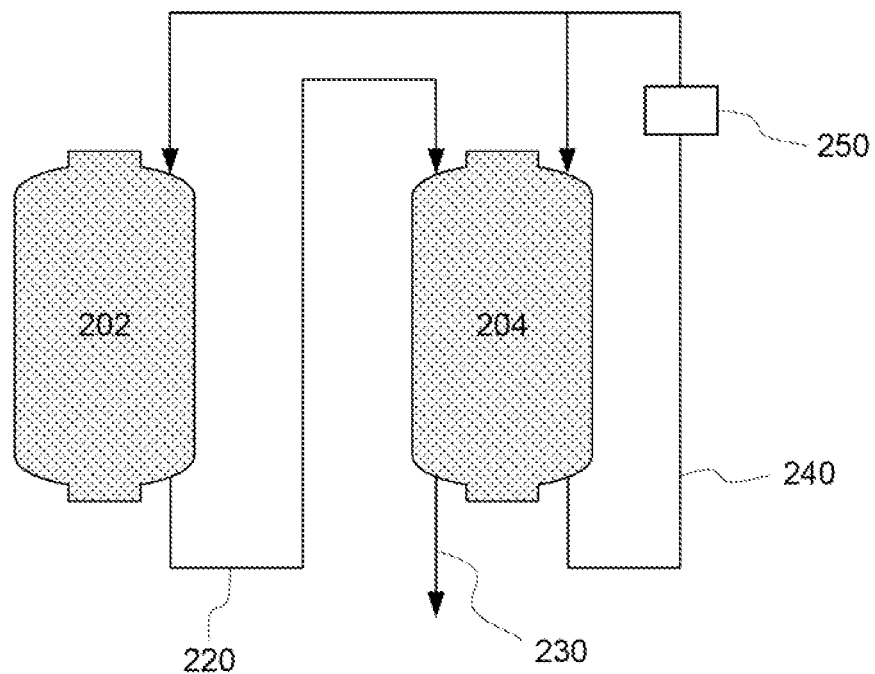
FIG. 11 is a schematic illustration of another example system for performing a method of recovering hydrocarbon products from oil shale in accordance with an example of the present invention.

FIG. 11 shows yet another example. In this example, an effluent stream 220 flows out of the first vessel 202 and directly into the second vessel 204. Liquid hydrocarbons 230 are removed from the second vessel. A second effluent stream also flows out of the second vessel, and the second effluent stream flows to a heater 250. After the heater, the second effluent stream splits and a portion of the stream is injected into the second vessel and another portion is injected into the first vessel.

Figure 12:
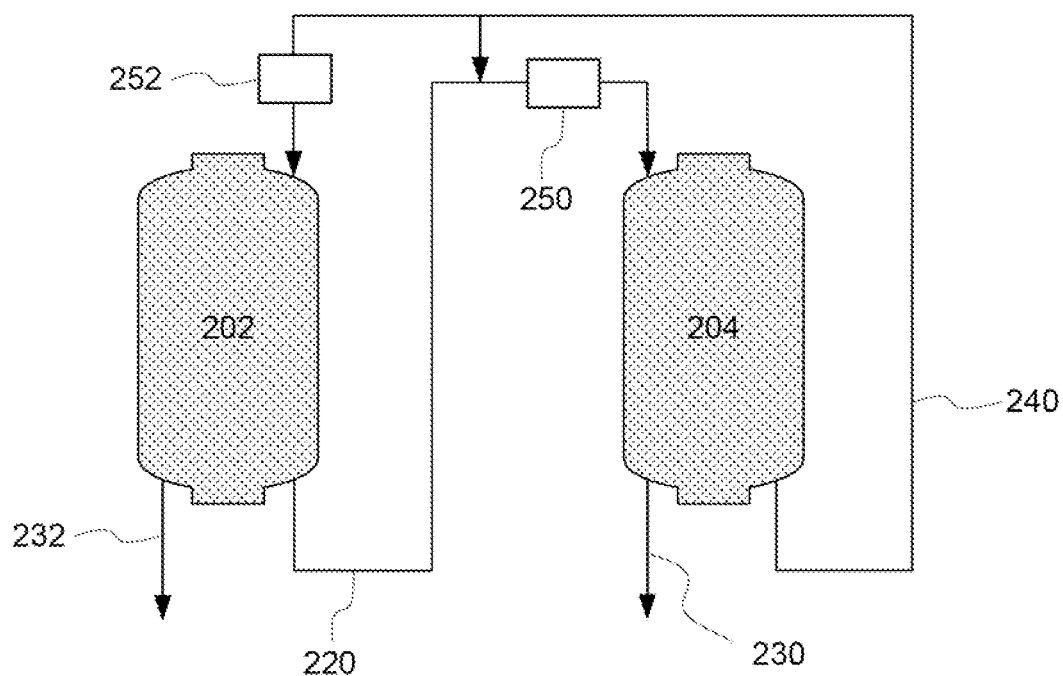
FIG. 12 is a schematic illustration of another example system for performing a method of recovering hydrocarbon products from oil shale in accordance with an example of the present invention.

FIG. 12 shows another example. In this example, a liquid hydrocarbon stream 232 is collected from the first vessel 202. An effluent stream 220 also flows out of the first vessel. The effluent stream is combined with a portion of the second effluent stream 240 from the second vessel 204 to form a combined effluent stream. The combined effluent stream then flows to a heater 250 to heat the combined effluent stream, and then the combined effluent stream is injected into the second vessel. The portion of the second effluent stream that was not combined with the first effluent stream is injected into the first vessel. This portion is heated by a second heater 252 before being injected into the first vessel. Liquid hydrocarbons 230 are also collected from the second vessel.

All of the examples described above can provide different results in the process. For example, heaters can be used to control the amount of heat introduced into the first and second vessels. Effluent streams can be mixed together or split in various ways to adjust the temperature and composition of the streams. Other equipment, such as condensers, can be included to adjust collection of liquid hydrocarbons.

Figure 13:
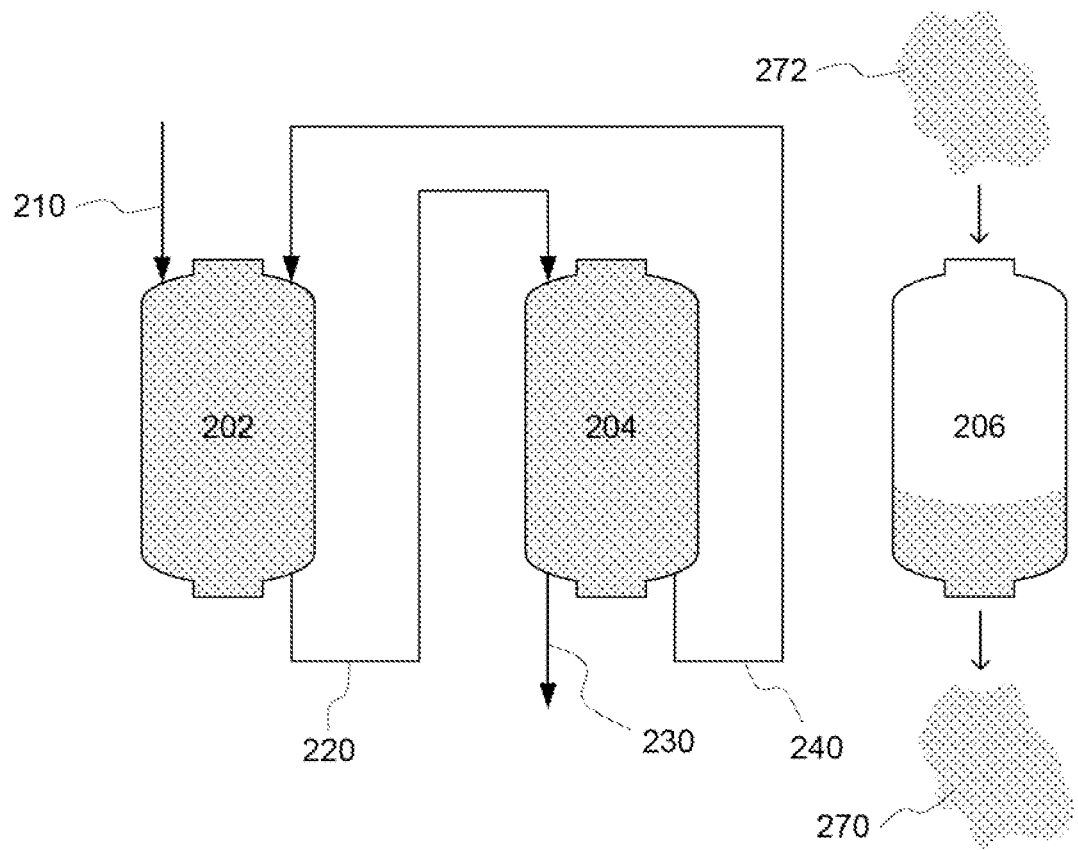
FIG. 13 is a schematic illustration of another example system for performing a method of recovering hydrocarbon products from oil shale in a first stage of operation in accordance with an example of the present invention.

Many of the examples described above include two vessels. One of the vessels operates in preheat mode while the other vessel operates in pyrolysis mode. In further examples, a third vessel can also be included. The third vessel can be in an emptying and refilling mode while the first and second vessels are operating concurrently. Any of the above examples can be modified to include a third vessel in emptying and refilling mode. One such example is shown in FIG. 13. This example includes a first vessel 202, a second vessel 204, and a third vessel 206. The third vessel is in emptying and refilling mode. Spent oil shale 270 is emptied from the bottom of the vessel, and then fresh oil shale 272 is refilled into the top of the vessel. This example also includes a working fluid 210 injected into the first vessel, an effluent stream 220 flowing out of the first vessel and into the second vessel, a second effluent stream 240 flowing out of the second vessel and being recycled back to the first vessel, and a liquid hydrocarbon stream 230 flowing out of the second vessel.

After the process has operated for a sufficient time to finish producing hydrocarbons from the oil shale in the first vessel, preheating the oil shale in the second vessel, and emptying and refilling the third vessel, then the vessels can be switched to another mode and the process can begin again. For example, once the third vessel has been filled with fresh oil shale, the third vessel is ready to switch to preheat mode. After the oil shale in the first vessel has been heated sufficient to substantially retort all the oil shale in the first vessel, the first vessel is ready to switch to emptying and refilling mode. Similarly, after the oil shale in the second vessel has been heated to the production temperature, the second vessel can be switched to pyrolysis mode.

Figure 14:
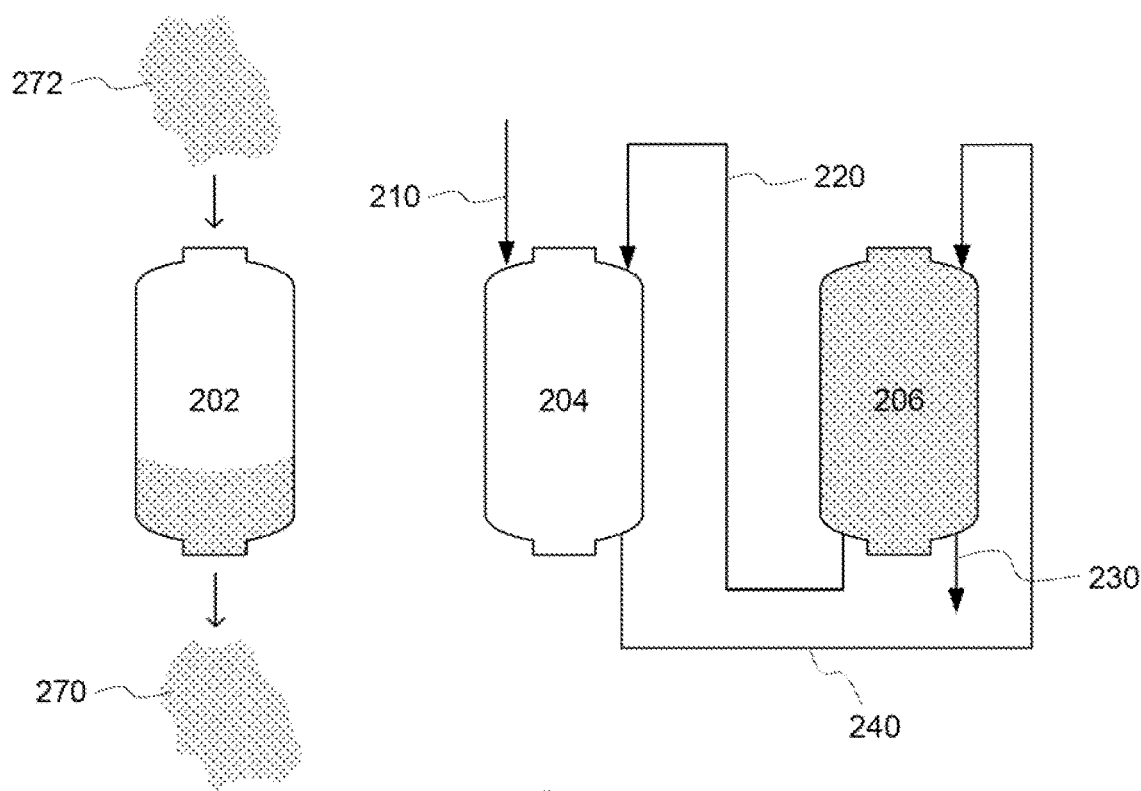
FIG. 14 is a schematic illustration of another example system for performing a method of recovering hydrocarbon products from oil shale in a second stage of operation in accordance with an example of the present invention.

The entire process can be described as having three stages that can be repeated to provide a semi-continuous process for extracting hydrocarbons from oil shale. The process shown in FIG. 13 can be considered as the first stage, in which the first vessel is in pyrolysis mode. An example of the second stage is shown in FIG. 14. In this stage, the third vessel 206 is in preheat mode, the first vessel 202 is in emptying and refilling mode, and the second vessel is in pyrolysis mode. The working fluid 210 is injected into the second vessel to heat the oil shale in the second vessel. In some examples, the working fluid can be switched between the vessels using a system of pipes and valves that allows the working fluid to be selectively injected into any of the vessels. Similarly, a system of pipes and valves can be used to direct effluent streams. In FIG. 14, an effluent stream 220 flows out of the third vessel and into the second vessel. A liquid hydrocarbon stream 230 is collected from the third vessel. A second effluent stream 240 also flows out of the second vessel and back to the third vessel. While the third vessel and the second vessel are operating in this way, the first vessel is emptied of spent oil shale 270 and refilled with fresh oil shale 272.

Figure 15:
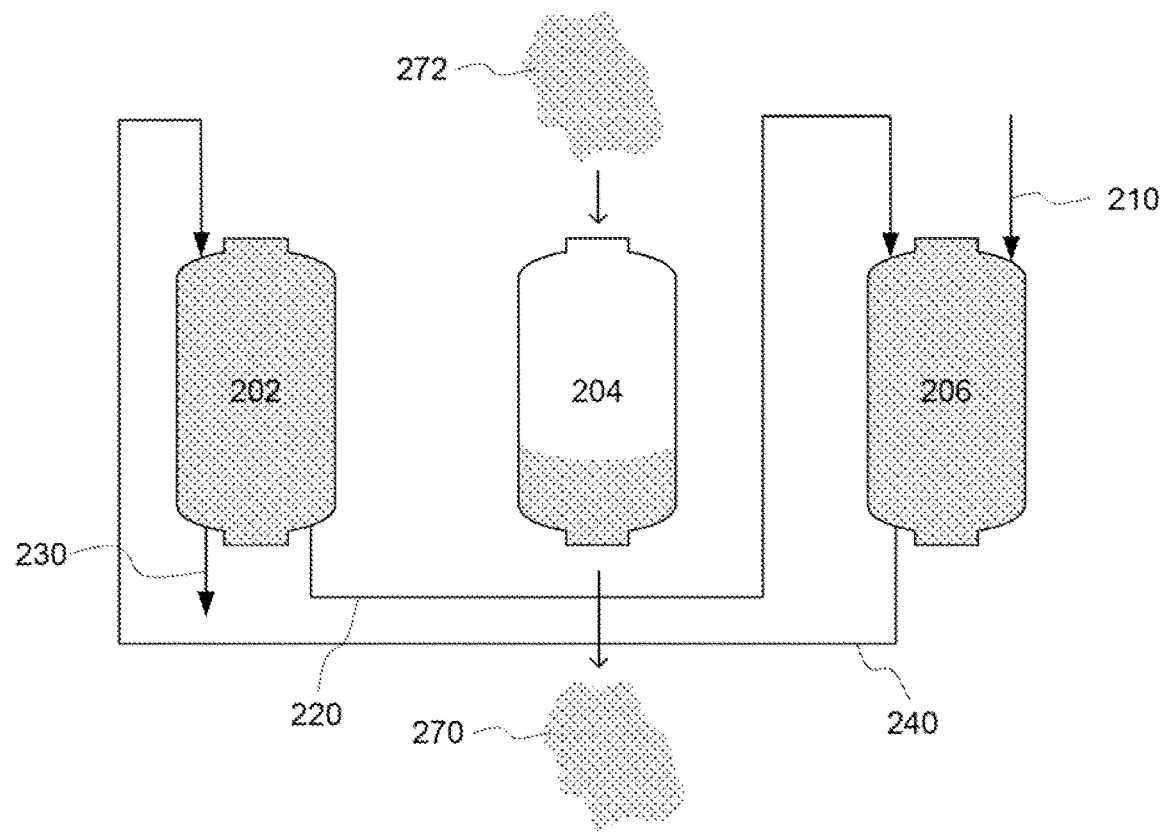
FIG. 15 is a schematic illustration of another example system for performing a method of recovering hydrocarbon products from oil shale in a third stage of operation in accordance with an example of the present invention.

FIG. 15 shows the third stage in this example process. In this stage, the second vessel 204 is in emptying and refilling mode, the third vessel 206 is in pyrolysis mode, and the first vessel 202 is in preheat mode. The working fluid 210 is injected into the third vessel. An effluent stream 220 flows out of the first vessel and into the third vessel. A liquid hydrocarbon stream 230 is collected from the first vessel. A third effluent stream 240 also flows out of the third vessel and the stream is injected into the first vessel. While the first and third vessels are operating, the second vessel is emptied of spent oil shale 270 and refilled with fresh oil shale 272. Any of the example processes shown in previous figures can be performed in a similar way in three stages by adding a third vessel and rotating sequentially through the modes for each vessel.

In further examples, the process can be divided into four stages that can be performed with four vessels. A cooling stage can include the period of time from when a cooler gas begins to flow into a vessel that contains substantially spent oil shale. The vessel in cooling mode can be cooled gradually, in some cases from the top down if the cooler gas in injected at the top. The cooler gas can be injected in this way until the spent oil shale is at a temperature that is safe for removing the spent oil shale from the vessel. The vessel can then switch to the emptying and refilling stage. In some examples, the cooler gas can be an effluent stream from another vessel that is in preheat mode. The vessel in preheat mode can contain oil shale at a cold temperature. Therefore, the effluent can also be at a cold temperature.

Figure 16:
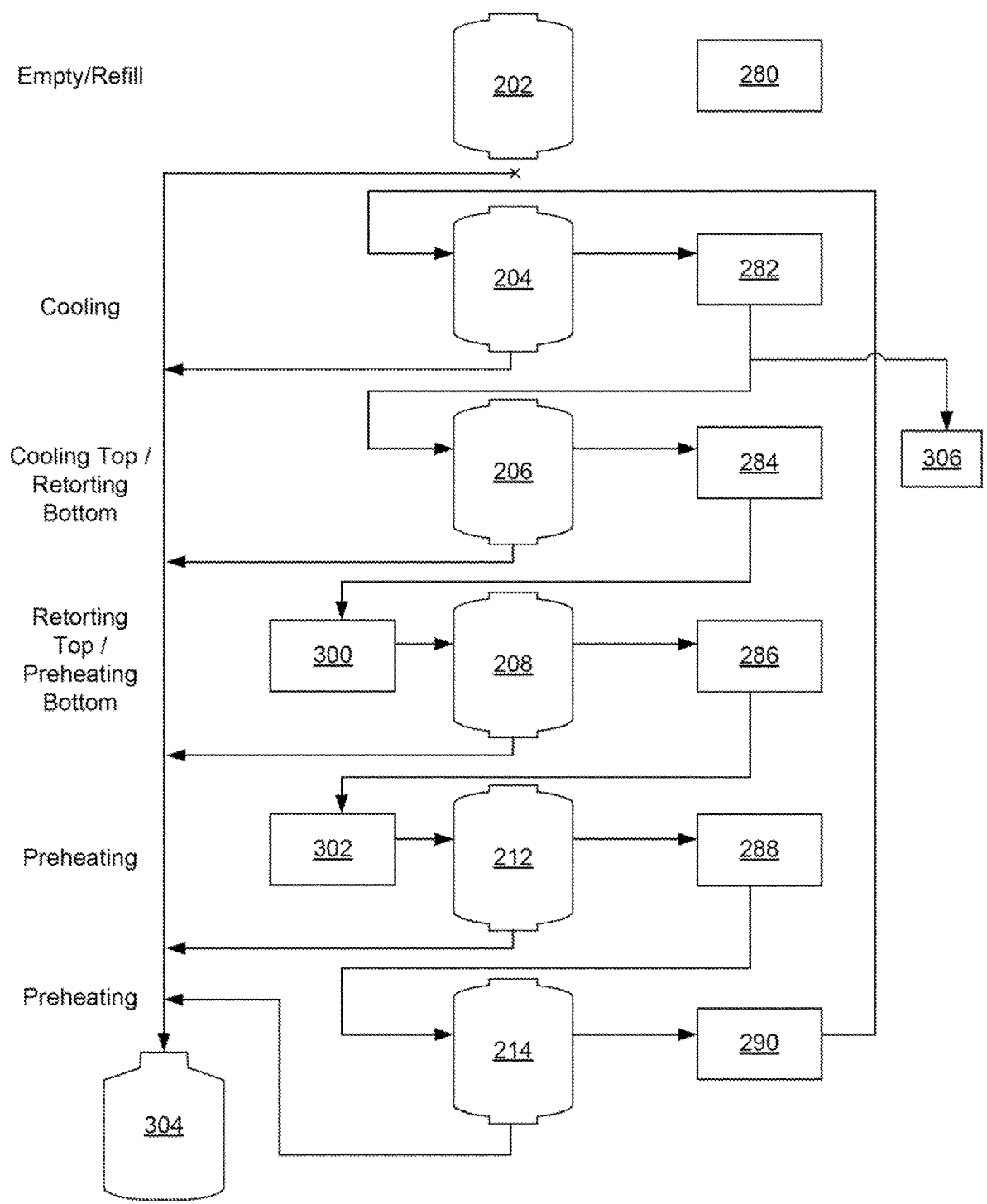
FIG. 16 is a schematic illustration of another example system having six retort vessels oriented in series in accordance with an example of the present invention.

Likewise, additional vessels can be added in series to allow for variation of operating parameters across multiple vessels, variability of vessel size constraints, and provide redundancy which can be optionally short-circuited for maintenance and/or cleaning while maintaining operation of other vessels. FIG. 16 is a process flow diagram generally showing one alternative having six retort vessels operating at different stages ranging from emptying and refilling, cooling down with no pyrolysis occurring, a beginning retorting stage in which upper portions are cooling while lower portions are operating in a pyrolysis mode, a completing stage in which a pyrolysis mode is operating in an upper region while lower stages are still heating up to a production temperature, and preheating stages. In this configuration, a first vessel 202 and an accompanying high temperature blower 280 are isolated from the process and working fluids during an emptying and refilling stage. Second vessel 204 can be operating in a cooling mode in which a cooled working fluid is injected. During this cooling mode, spent shale is cooled, gaseous and vapor products are condensed, fines can be removed through circulation of condensed hydrocarbon through the stationary bed, and hydrogen sulfide can be captured. Condensed hydrocarbons can be collected and directed to a liquid storage 304. While passing through the second vessel 204 working fluid draws heat from the cooling stationary bed of spent shale.

The working fluid can then be directed to a third vessel 206 via a high temperature blower 282. The third vessel 206 can be operating in a cooling mode and pyrolysis mode where upper portions of the stationary bed are cooling while a lower portion is operating in a pyrolysis mode. As with the second vessel, the cooling mode can also condense product from both the working fluid and product produced from the lower portion of the third vessel, while also removing entrained fines and sequestering hydrogen sulfide. For example, fines can be removed through adsorption as fluid flows across surfaces of the particulate oil shale. Although some physical sized-based filtering can occur, fines tend to migrate across thin films of liquid which pass over particulates. By controlling flow rates of liquids through the particulate bed, fines have sufficient time to migrate toward oil shale particle surfaces and become entrapped. As with vessel 204, condensed liquids can be collected and directed to the liquid storage 304. Once again, working fluid passing through the third vessel has an increased outlet temperature and is cycled to a fourth vessel 208 via another high temperature blower 284.

The fourth vessel 208 can be operating in a pyrolysis mode at least in an upper portion. Accordingly, it can be desirable to step up a temperature of the working fluid via a gas heater 300. Suitable temperatures can be about the production temperature to about 50° F. above production temperature, depending on conditions such as sweep rates, desired residence time, void space, and the like. Supplementally heated working fluid can then be injected into the fourth vessel 208. Although the fourth vessel may be operating entirely under pyrolysis mode, in this example, a lower portion of the fourth vessel 208 can be operating in a preheat mode where materials are progressively increasing in temperature while also serving to condense hydrocarbon products, capture fines, and sequester hydrogen sulfide until they reach production temperature. Condensed liquids can then be directed to liquid storage 304.

Working fluid from the fourth vessel 208 can then be directed to a fifth vessel 212 via a high temperature blower 286 and second gas heater 302. This fifth vessel 212 can be operating primarily in a preheating mode which is below the production temperature. In this case, even though the stationary bed is ramping up in temperature, the bed can serve to simultaneously condense gaseous and vapor products within the working fluid, while also removing fines from the condensed liquids as they pass over surfaces of the particulate bed. Condensed liquids are once again directed to the liquid storage 304, while working fluid can be directed to a sixth vessel 214 via a high temperature blower 288.

Sixth vessel 214 can also be operating in a preheat mode similar to the fifth vessel 212. Condensed liquids from the sixth vessel 214 can be directed to the liquid storage 304. In this case, a high temperature blower 290 can direct working fluid from the sixth vessel back to the second vessel 204. Depending on operating conditions, the working fluid may no longer have recoverable heat due to insufficient differences in heat value or temperature.

It should be kept in mind that the modes and process described above in connection with FIG. 16 is merely a static snapshot of a dynamic non-steady state process in which operating modes of each vessel progressively transition from preheat to pyrolysis to cooling and then to emptying and refill.

In many of the examples described above, the pyrolysis stage has been described as including the process of cooling the oil shale gradually, starting at the top of the vessel. However, in some examples the pyrolysis stage can be a stage in which hot working fluid is injected into the vessel and during which the oil shale in the vessel is substantially all at or above the production temperature. This pyrolysis stage can continue for a sufficient period of time to substantially retort the oil shale. The vessel can then switch to the cooling stage.

In various examples, the oil shale can be crushed before being loaded into the vessels. In some examples, the particulate oil shale in the vessel can have greater than about 10% void space. In certain examples, the oil shale can have from about 20% to about 50% void space although other ranges may be suitable such as up to about 70%. High permeability can reduce the cost of pumping working fluid through the vessel. In some examples, the void space can also be adjusted to minimize flow channeling. Flow channeling can make it more difficult to achieve a uniform temperature in the horizontal dimensions. This can make it difficult to properly control the temperature of the oil shale in the vessel so that the oil shale reaches the production temperature for a sufficient time to produce hydrocarbon products therefrom. The particle size of the oil shale can be from about 1 cm to about 30 cm on average, in some examples.

The vessels used in the methods described herein can have any suitable design. In certain examples, the vessels can be vertical retorts, meaning that the vessels can have a height that is greater than the width or diameter. In some examples, the vessels can have a cylindrical overall shape. In some examples, the vessels can have a height from about 10 ft. (3.05 m) to about 50 ft. (7.62 m). The diameter of the vessels can be from about 5 ft. (1.52 m) to about 35 ft. (3.05 m). The vessels can include doors or hatches for loading and unloading particulate oil shale. For example, a hatch at a top of the vessel can be used load oil shale into the vessel while another hatch at the bottom of the vessel can be used to remove oil shale from the vessel.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method of recovering hydrocarbon products from oil shale, comprising:
    injecting a working fluid into a first vessel in a pyrolysis mode, wherein the working fluid consists of one or more of a combustion product gas, a non-condensable hydrocarbon product from pyrolysis, methane, and natural gas, wherein the first vessel contains particulate oil shale, wherein the working fluid has a temperature at or above a production temperature, wherein the production temperature is sufficient to pyrolyze kerogen in the oil shale, wherein the particulate oil shale in the first vessel has an average temperature at or above the production temperature and is a substantially stationary bed during heating;
    concurrently flowing an effluent out of the first vessel, said effluent including the working fluid, condensed hydrocarbon product, condensable hydrocarbon product, and non-condensable hydrocarbon product and optionally removing condensed hydrocarbon product, and injecting the effluent into a second vessel in a preheating mode, wherein the second vessel contains particulate oil shale having an average temperature below the production temperature so as to capture heat from the effluent sufficient to increase the average temperature of the particulate oil shale and to condense at least a portion of the condensable hydrocarbon product to increase a volume of the condensed hydrocarbon product and to avoid rejecting heat to surrounding environment through external heat exchangers, and wherein the second vessel is a substantially stationary bed during heating and mineral fines entrained in the effluent are at least partially removed from the effluent via filtering and adsorption to the particulate oil shale and entrained mists of condensed hydrocarbons are consolidated with the condensed hydrocarbon product as a liquid;
    concurrently collecting liquid hydrocarbons from the second vessel, said liquid hydrocarbons including the condensed hydrocarbon product; and
    concurrently flowing a second effluent out of the second vessel, said second effluent including the working fluid and non-condensed hydrocarbon product, and recycling the second effluent to the first vessel.

2. The method of claim 1, wherein recycling the second effluent to the first vessel includes passing the second effluent through a third vessel in a cooling mode, wherein the third vessel contains particulate spent oil shale at a temperature higher than a temperature of the second effluent, such that the second effluent is heated before being recycled to the first vessel.

3. The method of claim 2, further comprising adding additional heat to the second effluent after passing the second effluent through the third vessel, before injecting the second effluent into the first vessel.

4. The method of claim 1, wherein the combustion product gas is produced using a gas turbine that simultaneously produces electricity.

5. The method of claim 1, wherein the particulate oil shale in the first vessel and in the second vessel has an average particle size from about 1 cm to about 30 cm.

6. The method of claim 1, wherein the first and second vessels have a height from about 10 ft. (3.05 m) to about 25 ft. (7.62 m).

7. The method of claim 1, wherein the production temperature is from about 680° F. to about 900° F. (about 360° C. to about 482° C.).

8. The method of claim 1, wherein the working fluid is injected at a top portion of the first vessel and wherein the effluent flows out a bottom portion of the first vessel.

9. The method of claim 1, wherein the working fluid is injected at a bottom portion of the first vessel and wherein the effluent flows out a top portion of the first vessel.

10. The method of claim 1, further comprising mixing the effluent with the second effluent to form a combined effluent stream, and injecting a first portion of the combined effluent stream into the first vessel while injecting a second portion of the combined effluent stream into the second vessel.

11. The method of claim 10, further comprising at least one of:
    adding heat to the combined effluent stream before splitting the first portion of the combined effluent stream from the second portion of the combined effluent stream; and
    adding heat to the second portion of the combined effluent stream.

12. The method of claim 11, wherein the adding heat is sufficient to increase the temperature of the combined effluent stream to within 25° F. (13.9° C.) of the production temperature.

13. The method of claim 11, wherein the optionally removing condensed hydrocarbon product from the effluent is not optional and comprises removing liquid hydrocarbons from the combined effluent stream before adding the heat to the combined effluent stream.

14. The method of claim 1, further comprising injecting a portion of the second effluent into the first vessel after adding heat to the second effluent.

15. The method of claim 14, further comprising mixing a portion of the second effluent with the effluent from the first vessel to form a combined effluent stream before adding the heat to the second effluent, wherein injecting the working fluid into the first vessel comprises injecting a portion of the combined effluent stream into the first vessel.

16. The method of claim 15, further comprising adding heat to the combined effluent stream before injecting the combined effluent stream into the first vessel.

17. The method of claim 1, further comprising concurrently filling fresh oil shale into a third vessel in an emptying and refilling mode.

18. The method of claim 17, further comprising performing the method until the oil shale in the second vessel reaches the production temperature, and switching modes of the first, second, and third vessels after the oil shale in the first vessel reaches the production temperature such that the second vessel is in the pyrolysis mode, the first vessel is in the emptying and refilling mode, and the third vessel is in the preheating mode.

19. The method of claim 18, wherein a time period for preheating the oil shale in the first vessel to the production temperature is from about 1 hour to about 48 hours.

20. A method of recovering hydrocarbon products from oil shale, comprising:
injecting a heated working fluid into a first vessel in a pyrolysis mode, wherein the working fluid consists of one or more of a combustion product gas, a non-condensable hydrocarbon product from pyrolysis, methane, and natural gas, wherein the first vessel contains particulate oil shale, wherein the heated working fluid has a temperature at or above a production temperature, wherein the production temperature is sufficient to pyrolyze kerogen in the oil shale, wherein the particulate oil shale in the first vessel has a temperature at or above the production temperature and is a substantially stationary bed during heating;
concurrently flowing an effluent out of the first vessel, said effluent including the working fluid, condensed hydrocarbon product, condensable hydrocarbon product, and non-condensable hydrocarbon product, and optionally removing condensed hydrocarbon product, and injecting the effluent into a second vessel in a preheating mode, wherein the second vessel contains particulate oil shale having an average temperature below the production temperature so as to capture heat from the effluent sufficient to increase the average temperature of the particulate oil shale and to condense at least a portion of the condensable hydrocarbon product to increase a volume of the condensed hydrocarbon product and to avoid rejecting heat to surrounding environment through external heat exchangers, and wherein the second vessel is a substantially stationary bed during heating and mineral fines entrained in the effluent are at least partially removed from the effluent via filtering and adsorption to the particulate oil shale and entrained mists of condensed hydrocarbons are consolidated with the condensed hydrocarbon product as a liquid;
concurrently collecting liquid hydrocarbons from the second vessel and the first vessel, said liquid hydrocarbons including the condensed hydrocarbon product;
concurrently flowing a second effluent out of the second vessel, said second effluent including the working fluid and non-condensable hydrocarbon product, and injecting the second effluent into a third vessel in a cooling mode, wherein the third vessel contains particulate spent oil shale having an average temperature above a temperature of the second effluent;
concurrently flowing a third effluent out of the third vessel, heating the third effluent, and injecting the third effluent into the first vessel such that the working fluid injected into the first vessel comprises the third effluent; and
concurrently emptying spent oil shale from a fourth vessel in an emptying and refilling mode, wherein the spent oil shale has already been heated to the production temperature to pyrolyze the kerogen in the spent oil shale and then cooled below the production temperature.

21. The method of claim 20, wherein the non-condensable hydrocarbon product from pyrolysis comprises methane.

22. The method of claim 20, wherein the combustion product gas is produced using a gas turbine that simultaneously produces electricity.

23. The method of claim 20, wherein the particulate oil shale in the first vessel and in the second vessel has an average particle size from 1 cm to 30 cm, and the vessels have a height from about 10 ft. (3.05 m) to about 25 ft. (7.62 m).

24. The method of claim 20, wherein the production temperature is from about 680° F. to about 900° F. (about 360° C. to about 482° C.).

25. The method of claim 20, wherein the working fluid is injected at a top portion of the first vessel and wherein the effluent flows out a bottom portion of the first vessel.

26. The method of claim 20, wherein the effluent is injected into a top portion of the second vessel and wherein the second effluent flows out a bottom portion of the second vessel.

27. The method of claim 20, further comprising mixing the effluent with the second effluent to form a combined effluent stream, and injecting a first portion of the combined effluent stream into the first vessel while injecting a second portion of the combined effluent stream into the second vessel, wherein injecting the second effluent into the third vessel comprises injecting a third portion of the combined effluent stream into the third vessel.

28. The method of claim 27, further comprising at least one of: adding heat to the combined effluent stream before splitting the first portion of the combined effluent stream from the second portion of the combined effluent stream; and adding heat to the second portion of the combined effluent stream.

29. The method of claim 28, wherein the adding heat is sufficient to increase the temperature of the combined effluent stream to within 25° F. (13.9° C.) of the production temperature.

30. The method of claim 28, wherein collecting liquid hydrocarbons from the first vessel comprises removing liquid hydrocarbons from the combined effluent stream before adding the heat to the combined effluent stream.

31. The method of claim 20, further comprising adding heat to the second effluent, and injecting a portion of the second effluent into the first vessel after adding the heat to the second effluent.

32. The method of claim 20, further comprising mixing a portion of the second effluent with the effluent from the first vessel to form a combined effluent stream, wherein injecting the working fluid into the first vessel comprises injecting a portion of the combined effluent stream into the first vessel.

33. The method of claim 32, further comprising adding heat to the combined effluent stream before injecting the combined effluent stream into the first vessel.

34. The method of claim 20, further comprising filling fresh oil shale into the fourth vessel after emptying the spent oil shale from the fourth vessel.

35. The method of claim 34, further comprising performing the method until the oil shale in the second vessel reaches the production temperature, and switching modes of the first, second, third and fourth vessels after the oil shale in the second vessel reaches the production temperature such that the second vessel is in the pyrolysis mode, the first vessel is in the cooling mode, the third vessel is in the emptying and refilling mode, and the fourth vessel is in the preheating mode.

36. A method of operating an oil shale processing system, comprising:
in a first stage:
injecting a working fluid into a first vessel, wherein the working fluid consists of one or more of a combustion product gas, a non-condensable hydrocarbon product from pyrolysis, methane, and natural gas, wherein the first vessel contains particulate oil shale, wherein the working fluid has a temperature at or above a production temperature, wherein the production temperature is sufficient to pyrolyze kerogen in the oil shale, wherein the oil shale in the first vessel has an initial average temperature at or above the production temperature and is a substantially stationary bed during heating,
flowing an effluent out of the first vessel and injecting the effluent into a second vessel, wherein the second vessel contains particulate oil shale having an initial average temperature below the production temperature so as to capture heat from the effluent sufficient to increase the average temperature of the particulate oil shale and to condense at least a portion of condensable hydrocarbon product within the working fluid and to avoid rejecting heat to surrounding environment through external heat exchangers, and mineral fines entrained in the effluent are at least partially removed from the effluent via filtering and adsorption to the particulate oil shale and entrained mists of condensed hydrocarbons are consolidated with the condensed hydrocarbon product as a liquid,
collecting liquid hydrocarbons from the first vessel,
flowing a second effluent out of the second vessel and injecting the second effluent into a third vessel, wherein the third vessel contains spent oil shale having an initial temperature at or above the production temperature and is a substantially stationary bed during heating, and wherein the second effluent cools the spent oil shale,
flowing a third effluent out of the third vessel and injecting the third effluent into the first vessel, wherein the third effluent has a temperature at or above the production temperature;
emptying spent oil shale from a fourth vessel,
refilling the fourth vessel with fresh oil shale, and
continuing to inject the effluent into the second vessel until the average temperature of the oil shale in the second vessel reaches the production temperature;
in a second stage:
injecting the effluent into the second vessel, wherein the effluent has a temperature at or above the production temperature,
flowing the second effluent out of the second vessel and injecting the second effluent into the fourth vessel to preheat the particulate oil shale in the fourth vessel,
collecting liquid hydrocarbons from the second vessel,
flowing a fourth effluent out of the fourth vessel and recycling the fourth effluent to the first vessel to cool spent oil shale in the first vessel,
emptying spent oil shale from the third vessel,
refilling the third vessel with fresh oil shale, and
continuing to inject the second effluent into the fourth vessel until the average temperature of the oil shale in the fourth vessel reaches the production temperature;
in a third stage:
injecting the second effluent into the fourth vessel, wherein the second effluent has a temperature at or above the production temperature,
flowing a fourth effluent out of the fourth vessel and injecting the fourth effluent into the third vessel to preheat the particulate oil shale in the third vessel,
collecting liquid hydrocarbons from the fourth vessel,
flowing a third effluent out of the third vessel and recycling the third effluent to the second vessel to cool spent oil shale in the second vessel,
emptying spent oil shale from the first vessel,
refilling the first vessel with fresh oil shale, and
continuing to inject the fourth effluent into the third vessel until the average temperature of the oil shale in the third vessel reaches the production temperature;
in a fourth stage:
injecting the fourth effluent into the third vessel, wherein the fourth effluent has a temperature at or above the production temperature,
flowing a third effluent out of the third vessel and injecting the third effluent into the first vessel to preheat the particulate oil shale in the first vessel,
collecting liquid hydrocarbons from the third vessel,
flowing the effluent out of the first vessel and recycling the effluent to the fourth vessel to cool spent oil shale in the fourth vessel,
emptying spent oil shale from the second vessel,
refilling the second vessel with fresh oil shale, and
continuing to inject the third effluent into the first vessel until the average temperature of the oil shale in the first vessel reaches the production temperature.

37. The method of claim 36, further comprising repeating the method by repeating the first stage following the fourth stage.

38. A startup process for an oil shale processing system, comprising:
injecting a heated working gas into a first vessel containing particulate oil shale, wherein the working fluid consists of one or more of a combustion product gas, non-condensable hydrocarbon product from pyrolysis, methane, and natural gas, wherein the working gas is at a temperature at or above a production temperature, the production temperature being a temperature sufficient to pyrolyze the particulate oil shale, wherein the particulate oil shale in the first vessel has an initial temperature below the production temperature and is a substantially stationary bed during heating;
flowing an effluent out of the first vessel, wherein the effluent has an initial temperature at the initial temperature of the particulate oil shale in the first vessel;
at a later time when the effluent has a temperature above the initial temperature, injecting the effluent into a second vessel containing particulate oil shale to preheat the particulate oil shale in the second vessel, wherein the particulate oil shale in the second vessel has an initial average temperature below the production temperature so as to capture heat from the effluent sufficient to increase the average temperature of the particulate oil shale and to avoid rejecting heat to surrounding environment through external heat exchangers, and wherein condensable hydrocarbons in the effluent condense in the second vessel to form liquid hydrocarbons and mineral fines entrained in the effluent are at least partially removed from the effluent via filtering and adsorption to the particulate oil shale and entrained mists of condensed hydrocarbons are consolidated with the condensed hydrocarbon product as a liquid;

recovering the liquid hydrocarbons from the second vessel;

flowing a second effluent from the second vessel, wherein the second effluent has an initial temperature at the initial temperature of the particulate oil shale in the second vessel;

at a later time when the particulate oil shale in the first vessel is substantially retorted, injecting the second effluent into a third vessel containing particulate oil shale to preheat the particulate oil shale in the third vessel, wherein the particulate oil shale in the third vessel has an initial temperature below the production temperature;

flowing a third effluent out of the third vessel, wherein the third effluent has an initial temperature below the production temperature;

stopping the flow of heated working gas into the first vessel and injecting the third effluent into the first vessel to cool the particulate oil shale in the first vessel; and at a later time when the particulate oil shale in the first vessel has cooled below the production temperature, emptying the first vessel and refilling the first vessel with fresh oil shale.

* * * * *